(12) United States Patent
Nagano

(10) Patent No.: US 8,185,265 B2
(45) Date of Patent: May 22, 2012

(54) PATH PLANNING DEVICE, PATH PLANNING METHOD, AND COMPUTER PROGRAM

(75) Inventor: Masakuni Nagano, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/645,841

(22) Filed: Dec. 23, 2009

(65) Prior Publication Data
US 2010/0168950 A1    Jul. 1, 2010

(30) Foreign Application Priority Data
Jan. 1, 2009   (JP) ................................ P2009-000002

(51) Int. Cl.
*G05D 1/00* (2006.01)

(52) U.S. Cl. ......... 701/25; 700/259; 701/23; 340/573.7; 345/474; 355/67

(58) Field of Classification Search ............... 700/259, 700/84, 177, 182, 185, 187, 188, 254, 302; 28/798; 340/573.7; 345/474; 381/381; 600/595; 356/394; 347/104, 2; 400/625, 573.7, 686.2, 400/988; 701/23, 25, 213, 217, 221, 301; 355/67, 53, 66, 71, 77; 271/126, 145, 188, 271/288, 273, 3.01; 134/62, 63, 66, 69, 78, 134/80, 84, 85, 86, 89; 156/361, 483, 485, 156/542; 180/167, 169; 192/218; 209/900, 209/93; 29/714, 740, 741, 743; 318/587; 34/92, 228; 342/455, 457; 250/226; 270/21.1; 15/414; 221/226

See application file for complete search history.

(56) References Cited

U.S. PATENT DOCUMENTS

| 4,772,831 | A | * | 9/1988 | Casler et al. | ............. 318/568.15 |
| 5,696,674 | A | * | 12/1997 | Trovato et al. | ................. 345/473 |
| 5,835,604 | A | * | 11/1998 | Lee | ............................... 380/51 |

(Continued)

FOREIGN PATENT DOCUMENTS

JP    2002-133351    5/2002

(Continued)

OTHER PUBLICATIONS

Z. Oota et al., "Introduction to Intelligent Robot—The Solution of the Motion Planning Problem", CORONA Publishing Co., Ltd., 4 pages (2001).

(Continued)

*Primary Examiner* — James P Trammell
*Assistant Examiner* — McDieunel Marc
(74) *Attorney, Agent, or Firm* — Finnegan, Henderson, Farabow, Garrett & Dunner LLP

(57) ABSTRACT

A path planning device includes: an initial position and posture path acquiring unit which acquires an initial position and posture path including a plurality of nodes connecting present position and posture of a control target to target position and posture and which configures a rigid body corresponding to the control target in each node in the position and posture path; an interference detector which detects interference with the control target by an obstruction; an external force calculator which calculates an external force for each rigid body; and a multi rigid body system dynamics simulation unit which performs a multi rigid body system dynamics simulation on a plurality of equations of rigid body motion and which acquires positions and postures of the control target at times corresponding to the nodes in the position and posture path.

8 Claims, 21 Drawing Sheets

U.S. PATENT DOCUMENTS

| | | | |
|---|---|---|---|
| 6,493,607 B1 * | 12/2002 | Bourne et al. | 700/255 |
| 6,728,581 B1 * | 4/2004 | Trovato et al. | 700/56 |
| 6,904,335 B2 * | 6/2005 | Solomon | 700/247 |
| 6,941,191 B2 * | 9/2005 | Jaeger | 700/245 |
| 7,110,859 B2 * | 9/2006 | Shibata et al. | 700/245 |
| 7,421,314 B2 * | 9/2008 | Stoddard et al. | 700/245 |
| 7,519,457 B2 | 4/2009 | Hasegawa et al. | |
| 7,613,545 B2 * | 11/2009 | Watanabe et al. | 700/245 |
| 2002/0059213 A1 | 5/2002 | Soga | |

FOREIGN PATENT DOCUMENTS

| | | |
|---|---|---|
| JP | 2006-350776 | 12/2006 |

OTHER PUBLICATIONS

S. Lavalle, "Rapidly-Exploring Random Trees: A New Tool for Path Planning", Computer Science Department, Iowa State University, pp. 1-4 (1998).

J. Kuffner Jr., et al., "Dynamically-stable Motion Planning for Humanoid Robots," Autonomous Robots vol. 12, No. 1, pp. 105-118 (2002) (pp. 1-21).

T. Flash et al., "The Coordination of Arm Movements: An Experimentally Confirmed Mathematical Model", The Journal of Neuroscience, vol. 5, No. 7, pp. 1688-1703 (1985).

K. Harada, et al., "Path Smoothing for Humanoid Motion Planning using B-spline", Proceeding of the 2008 JSME Conference on Robotics and Mechatronics, 4 pages (2008).

Office Action dated Oct. 25, 2010, from Japanese Patent Office in counterpart Japanese Patent Application No. 2009-000002 (4 pages).

Mercer, G.N. et al., "Two Continuous Methods for Determining a Minimal Risk Path Through a Minefield," Anziam J. 48 (CTAC2006), 2007, pp. C293-C306, 14 pages.

Cheng, Peng et al., "Using Randomization to Find and Optimize Feasible Trajectories for Nonlinear Systems," Proceedings of Annual Allerton Conference on Communications, Control, Computing, 2000, pp. 926-935, 10 pages.

* cited by examiner

FIG. 1A
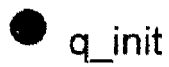
q_init
FIG. 1B
q_rand
● q_init
FIG. 1C
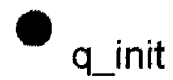
q_rand
q_new
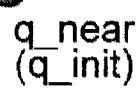
q_near
(q_init)

q_init q_rand q_init q_rand
q_new
q_near
q_init

INSTANTANEOUS POSITION OF
MULTI RIGID BODY SYSTEM (NODE SEQUENCE)

IDEAL PATH FORCE

PATH PLANNING DEVICE, PATH PLANNING METHOD, AND COMPUTER PROGRAM

BACKGROUND OF THE INVENTION

1. Field of the Invention

The present invention relates to a path planning device, a path planning method, and a computer program, which can plan a motion control of a robot or a motion route or path of a control target such as a finger tip of a multi-joint arm from present position and posture to target position and posture in a motion space, and more particularly, to a path planning device, a path planning method, and a computer program, which can correct a path of a control target for avoiding an obstruction into a smooth path for easy use in motion control or path control.

2. Description of the Related Art

For example, when a moving machine such as a robot or a finger tip as an end effector of a multi-joint arm is autonomously controlled in motion, a motion route or path from some position and posture (present position and posture: start) to another position and posture (target position and posture: goal) in a motion space should be planned. In the following description, the "route" and the "path" are both called "path". Unless otherwise particularly specified, a path means a path of position and posture. That is, a path in a three-dimensional space means a six-degree-of-freedom path for describing a spatial posture of an object.

The invention is mainly directed to generating rapidly a smooth path of a robot or a multi-joint arm from the present position and posture to the target position and posture. The inventors consider that the following four requirements should be satisfied to accomplish the above-mentioned purpose:

(1) to acquire rapidly an initial position and posture path for accomplishing a target position and posture path, which is not the optimal solution;

(2) to acquire a smooth position and posture path;

(3) to avoid infiltration (collision or interference) between objects in a position and posture path; and (4) to approach an ideal position and posture path (reflecting a designer's intention) as closely as possible.

It is difficult to acquire the optimal solution from infinite paths. Various path planning methods such as a potential method (for example, see "Introduction to Intelligent Robot—The Solution of the Motion Planning Problem", written by ZYUNN OOTA and others (CORONA Publishing Co., Ltd., 2001)), a stochastic road map method (for example, see "Introduction to Intelligent Robot—The Solution of the Motion Planning Problem", written by ZYUNN OOTA and others (CORONA Publishing Co., Ltd., 2001)), and a rapidly-exploring random tree (RRT) method (for example, see "Rapidly-Exploring Random Trees: A New Tool for Path Planning" (TR. 98-11, Computer Science Dpt., Iowa State University, October 1998), written by Steven M. Lavalle) have been suggested.

In the potential method, a path is planned by repeating a procedure of defining a potential field of an "attractive potential" attracting a control target to a target posture in a motion space and a "repulsive potential" repulsing the control target from an obstruction, calculating a gradient of the potential field in the present posture of the control target, and finely moving the control target in a direction in which the potential decreases.

For example, a path generating device has been suggested which calculates an attractive potential and a repulsive potential based on relative positional relations among a mobile object, an obstruction, and a target object using a map in a motion space generated on the basis of information on positions and shapes of the mobile object, the obstruction, and the target object, generates a combined potential as the sum of the potentials, searching a route in the map on the basis of the combined potential to determine whether a convergent position of the route search is a local minimum, generates a virtual potential obtained by increasing the potential of the convergent position by a predetermined value when the convergent position is the local minimum, and generates a motion path of the mobile object on the basis of the result of route search when the convergent position is a target position (for example, see Japanese Unexamined Patent Application Publication No. 2006-350776).

In the stochastic road map method, one posture is randomly selected from a configuration space, the posture is branched when it can move to a near posture, a random walk is taken from a certain posture in a region having many obstructions when a road map is not connected, the road map is extended, and a Dijkstra method as a mathematical programming method is applied to calculate the shortest distance in the road map.

For example, a lowest-cost path search device has been suggested which searches for a path from an entrance node to an exit node with the lowest cost in a network using the Dijkstra method (for example, see Japanese Unexamined Patent Application Publication No. 2002-133351).

The RRT is a tree data structure properly encompassing a motion space and an algorithm serving as a basis for generating the tree. In the RRT algorithm, an initial position is first set in the motion space, a random sampling position is configured in the same motion space, the nearest position between the initial position and the sampling position is searched for, and the initial position and the nearest position are connected to and added to the tree. Thereafter, by repeating the configuration of the sampling position relative to the added nearest position, the additional search for the nearest position, and the addition of the searched nearest position to the tree, it is possible to generate a tree encompassing the motion space. The RRT algorithm is widely used in path planning or path generation in real time (for example, see "Dynamically-stable Motion Planning for Humanoid Robots" (Autonomous Robots vol. 12, No. 1, pp. 105-118, 2002), written by James J. Kuffner) and have been greatly studied.

In the potential method, it is difficult to calculate efficiently a stable motion path, in that there is a possibility that plural positions and postures having the minimum potential may appear in addition to the target position and posture, which is very intuitive. The stochastic road map method has a disadvantage in that it is difficult to plan a motion in a narrow space surrounded with many obstructions, that is, plural positions and postures should be sampled. The RRT algorithm, can enable relatively rapid path planning in a multi-dimensional configuration space, but has a disadvantage that the searched path includes many detours due to the use of random search.

In this way, the past path planning methods have advantages and disadvantages. It is necessary to correct the path generated by one method in order to smooth the path or avoid an obstruction. As a method of smoothing a path, methods using the minimum jerk (for example, see "The Coordination of Arm Movements: An Experimentally Confirmed Mathematical Model" (The Journal of Neuroscience, Vol. 5, No. 7, pp. 1688-1703, 1985), written by T. Flash and N. Hogan), the minimum torque, the polynomial expression (spline) have been suggested.

However, no method can satisfy the requirements of (2) to acquire a smooth position and posture path, (3) to avoid infiltration between objects, and (4) to approach an ideal position and posture path. In other words, it is not possible to obtain a satisfactory path for use in the motion control of a robot or the final control for the path planning of a finger tip of a multi-joint arm.

For example, a method of smoothing a humanoid motion planning path using the B-spline has been suggested (for example, see "Smoothing of Humanoid Motion Planning Path using B-spline" (Proceedings of the 2008 JSME Conference on Robotics and Mechatronics, 2P1-F16, 2008), written by HARADA, MORITAKU, MIURA, HUZIWARA, AND KAZITA). In this method, the correction of path can be carried out using positions in a space and three-degree-of-freedom postures, but there is a problem in that the calculation amount is excessively great.

SUMMARY OF THE INVENTION

It is desirable to provide a path planning device, a path planning method, and a computer program, which can plan a motion control of a robot or a motion route or path of a control target such as a finger tip of a multi-joint arm from present position and posture to target position and posture in a motion space.

It is also desirable to provide a path planning device, a path planning method, and a computer program, which can search for a path of a control target for avoiding an obstruction and correct the path into a smooth path for easy use in motion control or path control of the control target.

It is also desirable to provide a path planning device, a path planning method, and a computer program, which can rapidly generate a smooth path of a control target from present position and posture to target position and posture.

According to an embodiment of the invention, there is provided a path planning device planning a position and posture path of a control target in a motion space from present position and posture to target position and posture, including: an initial position and posture path acquiring unit which acquires an initial position and posture path including a plurality of nodes connecting the present position and posture of the control target to the target position and posture and which configures a rigid body corresponding to the control target in each node in the position and posture path; an interference detector which detects interference with the control target in the position and posture path by an obstruction existing in the motion space; an external force calculator which calculates an external force for each rigid body expressing a requirement for smoothing the position and posture path and avoiding interference by the obstruction; and a multi rigid body system dynamics simulation unit which performs a multi rigid body system dynamics simulation on a plurality of equations of rigid body motion in which coupled motions of the plurality of rigid bodies on which the external forces calculated by the external force calculator act, respectively, and which acquires positions and postures of the control target at times corresponding to the nodes in the position and posture path on the basis of the positions and postures of the rigid bodies when the path is convergent to a predetermined state.

In the path planning device, the initial position and posture path acquiring unit may acquire a path between the present position of the control target and the target position on the basis of a search tree branched into a plurality of routes to the plurality of nodes and developed in the motion space and may give an initial posture to the rigid body located at each node.

In the path planning device, the interference detector may apply a GJK algorithm (described later) to detect the shortest distance between each rigid body and the obstruction.

In the path planning device, the external force calculator may use a dynamical model in which a virtual rigid body plane fixed in a local coordinate system of each rigid body is defined and corresponding vertexes of the neighboring virtual rigid body planes are connected to each other by springs having a predetermined spring constant and dampers having a predetermined damping constant to calculate, as the external forces expressing the requirement for smoothing the position and posture path, an inter-rigid-body force which is the sum of spring forces and damper forces acting between the vertexes of one virtual rigid body plane and the corresponding vertexes of the neighboring virtual rigid body plane and a rotational moment, which acts on the virtual rigid body, about an origin of a global coordinate system including the sum of moments acting on the vertexes of each virtual rigid body due to the spring forces and the damper forces.

In the path planning device, the interference detector may detect the shortest distance between the rigid body located at each node in the position and posture path and the obstruction, and the external force calculator may calculate a repulsive force acting on each rigid body depending on the shortest distance as the external force expressing the requirement for causing the position and posture path to avoid interference by the obstruction.

In the path planning device, the external force calculator may calculate the moment corresponding to an angle formed by a forward moving direction of each rigid body fixed in the local coordinate system of the rigid body and a direction of the position and posture path between the neighboring rigid bodies as the external force expressing a requirement for approaching an ideal position and posture path.

According to another embodiment of the invention, there is provided a path planning method of planning a position and posture path of a control target in a motion space from present position and posture to target position and posture, including the steps of: acquiring an initial position and posture path including a plurality of nodes connecting the present position and posture of the control target to the target position and posture and configuring a rigid body corresponding to the control target in each node in the position and posture path; detecting interference with the control target in the position and posture path by an obstruction existing in the motion space; calculating an external force for each rigid body expressing a requirement for smoothing the position and posture path and avoiding interference by the obstruction; and performing a multi rigid body system dynamics simulation on a plurality of equations of rigid body motion in which coupled motions of the plurality of rigid bodies on which the calculated external forces act, respectively, and acquiring positions and postures of the control target at times corresponding to the nodes in the position and posture path on the basis of the positions and postures of the rigid bodies when the path is convergent to a predetermined state.

According to another embodiment of the invention, there is provided a computer program which is described in a computer-readable manner so as to cause a computer to perform processes of planning a position and posture path of a control target in a motion space from present position and posture to target position and posture, the computer program causing the computer to serve as: an initial position and posture path acquiring unit which acquires an initial position and posture path including a plurality of nodes connecting the present position and posture of the control target to the target position and posture and which configures a rigid body corresponding to the control target in each node in the position and posture path; an interference detector which detects interference with the control target in the position and posture path by an obstruction existing in the motion space; an external force calculator which calculates an external force for each rigid body expressing a requirement for smoothing the position and posture path and avoiding interference by the obstruction; and a multi rigid body system dynamics simulation unit which performs a multi rigid body system dynamics simulation on a plurality of equations of rigid body motion in which coupled motions of the plurality of rigid bodies on which the external forces calculated by the external force calculator act, respectively, and which acquires positions and postures of the control target at times corresponding to the nodes in the position and posture path on the basis of the positions and postures of the rigid bodies when the path is convergent to a predetermined state.

The above-mentioned computer program serves to define a computer program which is described in a computer-readable manner so as to carry out predetermined processes in a computer. In other words, by installing the above-mentioned computer program in a computer, cooperative operations can be performed by the computer and thus the same operational advantages as the above-mentioned path planning device according to the embodiment of the invention can be obtained.

According to the embodiments of the invention, it is possible to provide a path planning device, a path planning method, and a computer program, which can plan a motion control of a robot or a motion route or path of a control target such as a finger tip of a multi-joint arm from present position and posture to target position and posture in a motion space.

According to the embodiments of the invention, it is possible to provide a path planning device, a path planning method, and a computer program, which can search for a path of a control target for avoiding an obstruction and correct the path into a smooth path for easy use in motion control or path control of the control target.

According to the embodiments of the invention, it is possible to provide a path planning device, a path planning method, and a computer program, which can rapidly generate a smooth path of a control target from present position and posture to target position and posture.

According to the embodiments of the invention, by treating the nodes in the path of the control target as rigid body models, it is possible to treat the posture path in addition to the position path of the control target.

According to the embodiments of the invention, it is possible to correct the initial position and posture path acquired by the initial position and posture path acquiring unit by introducing the multi rigid body system dynamics simulation.

According to the embodiments of the invention, it is possible to combine performance of the process of correcting a position and posture path in the dimension of force by expressing the requirements for smoothing the position and posture path of the control target and the process of avoiding interference by an obstruction as a dynamical model, that is, a dynamical restriction.

According to the embodiments of the invention, it is possible to obtain the positions and postures of the rigid bodies by applying the multi rigid body system dynamics simulation to the plural equations of rigid body motion expressing the coupled motions including plural rigid bodies subjected to the dynamical restriction. The positions and postures correspond to the positions and postures of the control target at times corresponding to the nodes in the position and posture path.

According to the embodiments of the invention, it is possible to avoid an obstruction in real time and to correct the target position and posture in real time.

According to the embodiments of the invention, the initial position and posture path acquiring unit can rapidly and satisfactorily search for a path for accomplishing the minimum purpose not necessarily restricted to the optimal solution without considering the smoothing of the path by applying the RRT algorithm. In the RRT algorithm, the positions of the nodes in the path are acquired and then the initial postures of the nodes are properly given. The postures in the nodes correspond to the local coordinate systems of the rigid bodies and the initial postures may be set in the global coordinate system.

According to the embodiment of the invention, by using an iterative method for calculating a distance between convex figures, such as the GJK algorithm, it is possible to detect the shortest distance between the nearest point pair or the most infiltrated point pair of the respective rigid bodies corresponding to the nodes in the path and the obstruction.

According to the embodiments of the invention, it is possible to satisfy the requirement "to acquire a smooth position and posture path" by the use of the dynamical restriction expression of the force (or replusive force) attracting the neighboring rigid bodies to each other, that is, an "inter-rigid-body force". Here, when the requirement "to acquire a smooth position and posture path" is expressed by the inter-rigid-body force, the problem of the overlapping of the neighboring rigid bodies is scarcely caused through treating the rigid bodies as virtual planes having no volume.

According to the embodiments of the invention, it is possible to satisfy the requirement "to avoid the infiltration between objects in a position and posture path" by the use of the dynamical restriction expression that the replusive force corresponding to the shortest distance between the control target and the obstruction is made to act on the rigid bodies.

According to the embodiments of the invention, it is possible to satisfy the requirement "to approach an ideal position and posture path as closely as possible" by the use of the dynamical restriction expression that the ideal posture path of the control target is defined as "causing the forward moving directions of the rigid bodies located at the nodes in the path to follow the path as closely as possible" and the moment corresponding to the angle formed by the forward moving direction of the rigid bodies and the direction of the position and posture path between the neighboring rigid bodies is made to act on the rigid bodies.

Other goals, features, and advantages of the invention will become apparent from the following detailed description based on the embodiments of the invention or the accompanying drawings.

BRIEF DESCRIPTION OF THE DRAWINGS

FIG. 1A is a diagram illustrating an algorithm basically used to generate a tree in an RRT.

FIG. 1B is a diagram illustrating an algorithm basically used to generate a tree in the RRT.

FIG. 1C is a diagram illustrating an algorithm basically used to generate a tree in the RRT.

DESCRIPTION OF THE PREFERRED EMBODIMENTS

Hereinafter, embodiments of the invention will be described in detail with reference to the accompanying drawings.

To generate rapidly a smooth path of a robot or a multi-joint arm from the present position and posture to the target position and posture, the following four requirements should be satisfied. In the following description, a "control target" includes a robot or a multi-joint arm.

(1) To acquire rapidly an initial position and posture path for accomplishing a target position and posture path, which is not the optimal solution.

(2) To acquire a smooth position and posture path.

(3) To avoid infiltration (collision or interference) between objects in a position and posture path.

(4) To approach an ideal position and posture path (reflecting a designer's intention) as closely as possible.

To satisfy the requirement of (1), how to search rapidly and satisfactorily for a path for accomplishing the minimum purpose not necessarily restricted to the optimal solution without considering the smoothing of the path is a criterion of selection. Therefore, in an embodiment of the invention, the above-mentioned RRT algorithm is used to acquire rapidly an initial position and posture path. The RRT algorithm has a disadvantage in that it lacks intuitiveness in a multi-dimensional problem, but the RRT algorithm does not lack intuitiveness in a low-dimensional problem. One feature of the RRT algorithm is to be able to plan relatively rapidly a path in a multi-dimensional configuration space.

Here, the sequence serving as a basis for generating a tree in the RRT algorithm will be described with reference to FIGS. 1A to 1G.

First, an initial position q_init is set in a motion space (see FIG. 1A).

Then, q_rand is randomly configured in the motion space (see FIG. 1B).

Figure 1D:
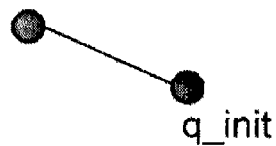
FIG. 1D is a diagram illustrating an algorithm basically used to generate a tree in the RRT.
Figure 1E:
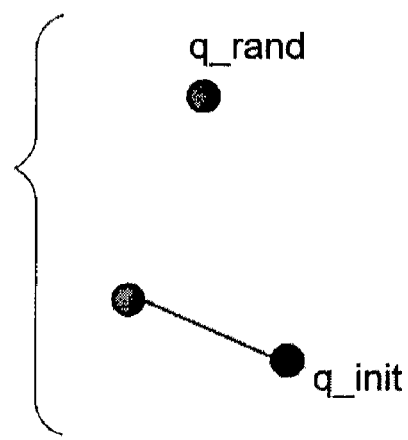
FIG. 1E is a diagram illustrating an algorithm basically used to generate a tree in the RRT.
Figure 1F:
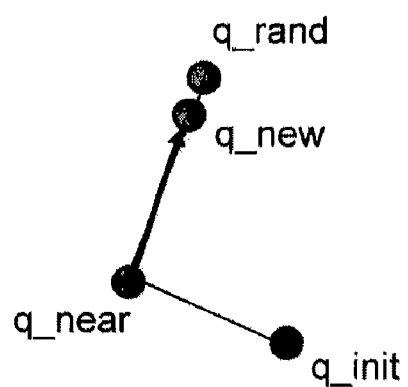
FIG. 1F is a diagram illustrating an algorithm basically used to generate a tree in the RRT.

Then, a node (that is, the nearest node) closest to q_rand in a tree (search tree) is set as q_near and q_new is set at a position apart by a predetermined distance toward q_rand from q_near (see FIG. 1C). Here, only q_init exists in the initial tree (see FIG. 1A). q_near and q_new are connected and q_new is added to the tree (see FIG. 1D).

q_rand is randomly configured again in the motion space (see FIG. 1E), the nearest node of q_rand in the tree is set as q_near, q_new is generated from q_near and q_rand in the same way as described previously, and q_new is added to the tree (see FIG. 1F).

Figure 1G:
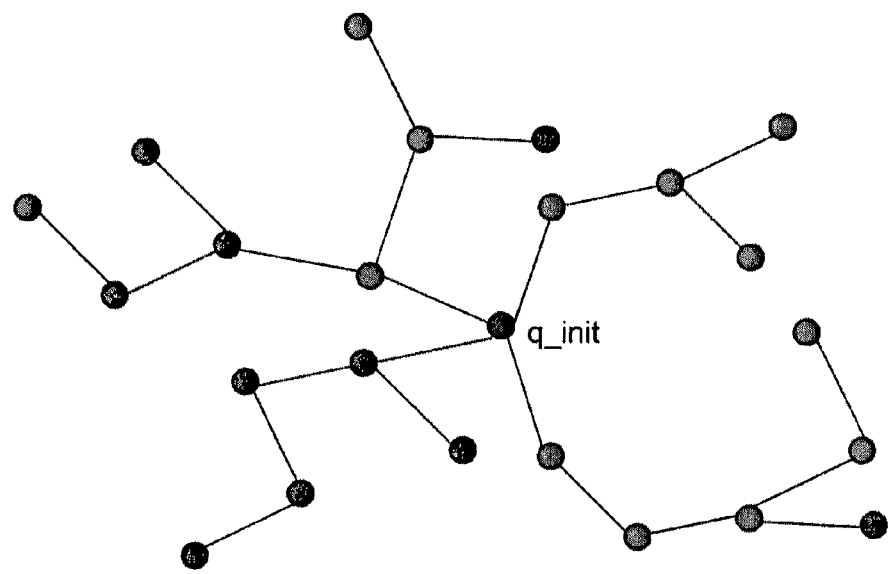
FIG. 1G is a diagram illustrating an algorithm basically used to generate a tree in the RRT.

By repeatedly performing the above-mentioned operations, it is possible to generate a tree encompassing the motion space (see FIG. 1G).

According to the RRT, it is possible to plan a path at a relatively high speed and to generate a reasonable path which may not be the optimal solution.

FIGS. 2A and 2B and FIGS. 3A and 3B show examples of a path generated by the RRT algorithm. In the drawings, for the purpose of simple explanation, the shape of a control target is set to a box shape (or a rectangular parallelepiped). However, the invention is not limited to the specific shape of the control target, but may be applied to any shape. It should be noted that the path planning is possible in any shape at a high speed. The details of the path planning method will be described later.

Figure 2A:
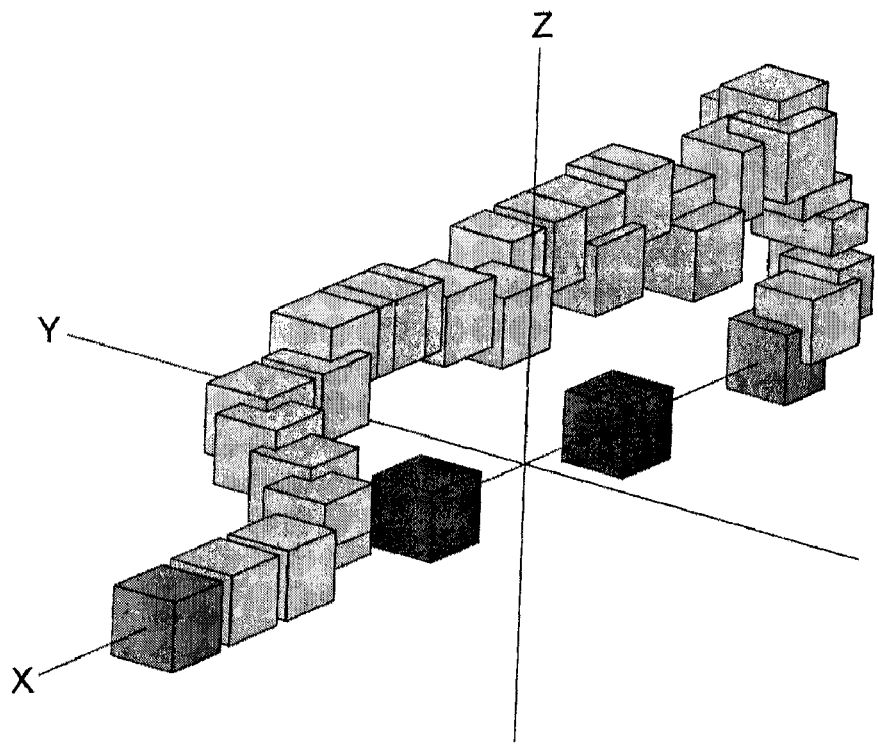
FIG. 2A is a diagram illustrating an example of a path generated using the RRT algorithm (where a control target is shown).
Figure 2B:
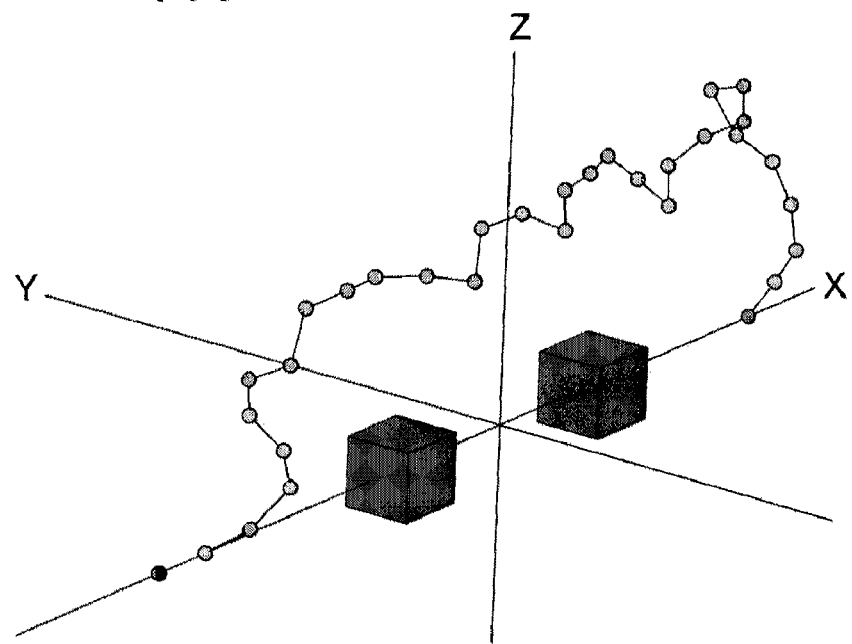
FIG. 2B is a diagram illustrating an example of a path generated using the RRT algorithm (where a control target is not shown).
Figure 3A:
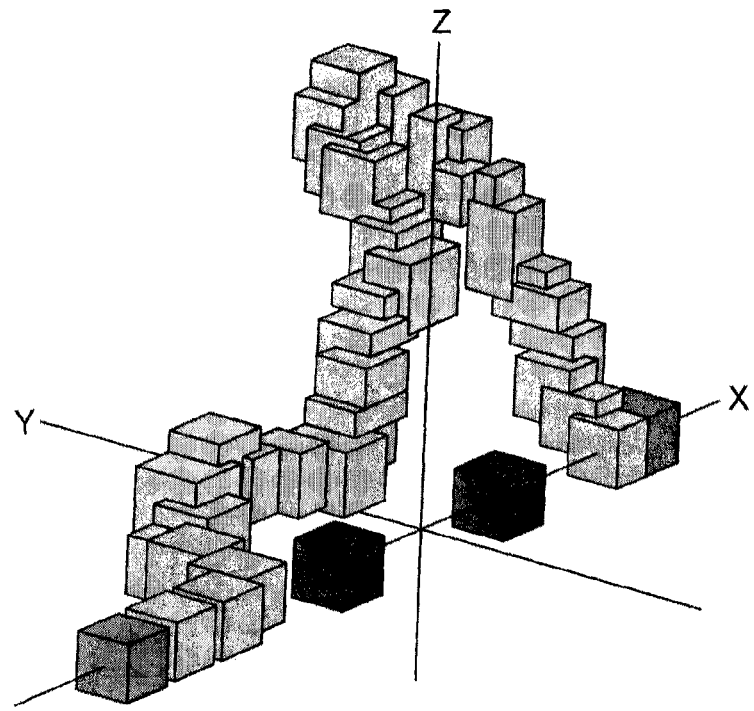
FIG. 3A is a diagram illustrating an example of a path generated using the RRT algorithm (where a control target is shown).
Figure 3B:
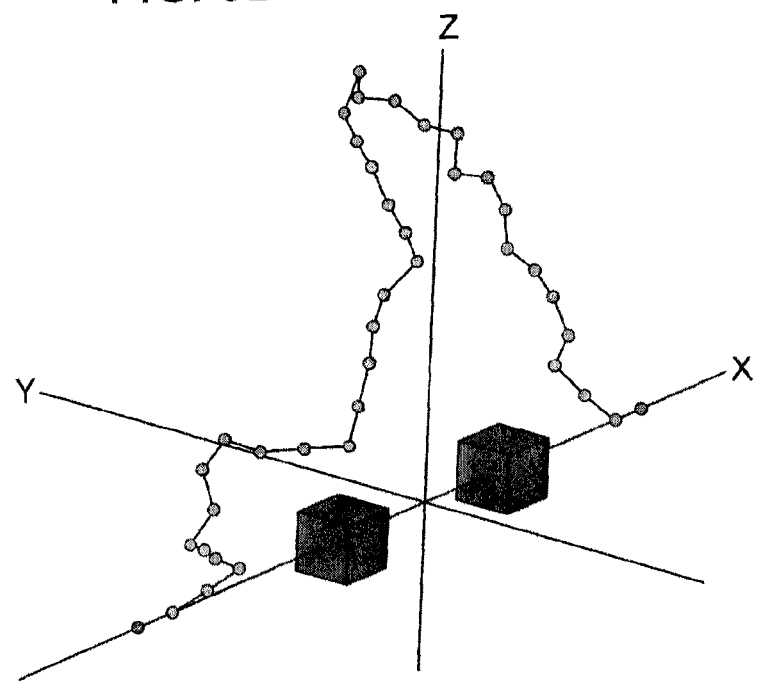
FIG. 3B is a diagram illustrating an example of a path generated using the RRT algorithm (where a control target is not shown).

FIGS. 2A and 3A show a box-like control target. FIGS. 2B and 3B do not show the control target and show the centers of gravity thereof as nodes. In FIGS. 2A and 3A, the boxes located at both ends represent the control target at the present position and posture (−x direction) and the target position and posture (+x direction), respectively, and a series of boxes connecting them represents the control target in the path generated by the RRT algorithm. The box located almost at the center represents an obstruction existing in the three-dimensional space and the path of the control target is searched for to avoid the obstruction box.

The configuration space of the RRT algorithm shown in FIGS. 2A and 2B and FIGS. 3A and 3B has three dimensions of position (x, y, z), but may have six dimensions including a posture, which does not affect the embodiment of the invention. To emphasise, the invention brings a great power of initial path search when a control target scarcely passes through many obstructions without frequently changing the posture of the control target. However, in this case, the decrease in speed of the initial path search using the RRT algorithm is undeniable. Accordingly, in this specification, the RRT algorithm in which the configuration space has three dimensions of position is described as an embodiment for realizing a rapider initial path search.

When it is intended to acquire the initial position and posture path using the RRT algorithm, a problem with the infiltration between objects at the time of avoiding an obstruction exists. Therefore, when the RRT algorithm is carried out in this embodiment, a Gilbert-Johnson-Keerthi distance (GJK) algorithm is applied to the problem with the infiltration between objects at the time of avoiding an obstruction. The GJK algorithm is an iterative method for calculating a distance between convex figures and serves to output the shortest distance of a representative collision point pair (a nearest point pair or a most infiltrated point pair) or between objects as the interference detection result. The interference detection result is treated using a dynamical model, the details of which will be described later. The details of the GJK algorithm can be referred to "Collision Detection in Interactive 3D Environments" (Morgan Kaufmann Publishers, 2004), written by G. Van den Bergen.

As can be seen from FIGS. 2A and 2B and FIGS. 3A and 3B, the initial path searched for by the RRT algorithm includes many detours for avoiding an obstruction and is wasteful as a path. Accordingly, it is necessary to satisfy the requirements of (2) to (4) after acquiring the initial position and posture path at a high speed using the RRT algorithm.

In the path generating device disclosed in Japanese Patent Application No. 2008-55681 assigned to the present applicant, multi mass point system dynamics simulation is used to satisfy the requirements of (2) to (4). In this simulation, the nodes in a path of a control target are treated as mass points, a dynamical model in which forces expressing the requirement for the path planning act between the neighboring nodes in the path and between the corresponding nodes in the optimal path is constructed, and the positions of the mass points, that is, the path, are corrected by performing a dynamics simulation operation. Here, since the nodes in the path are expressed as mass points, the position of the control target in the path can be calculated, but the posture of the control target in the path may not be calculated.

On the contrary, in this embodiment, the multi rigid body system dynamics simulation is introduced to satisfy the requirements of (2) to (4). The "multi rigid body system dynamics simulation" is a method of calculating the positions and postures of the rigid bodies by expressing the requirements of (2) to (4) as external forces acting on the rigid bodies and performing the dynamics simulation operation while sequentially rigid body models corresponding to the control target at the position of the nodes in the path. The position and posture of the rigid body located at each node in the path correspond to the position and posture of the control target at the corresponding time when it moves from the present position and posture to the target position and posture. The multi rigid body system dynamics simulation is similar to the multi mass point system dynamics simulation, in that the forces expressing the requirements of (2) to (4) for the path planning are made to act on the nodes in the path of the control target, but the posture of the control target can also be treated along with the position of the control target at the time of generating a path by configuring a rigid body instead of a mass point in each node.

Figure 4:
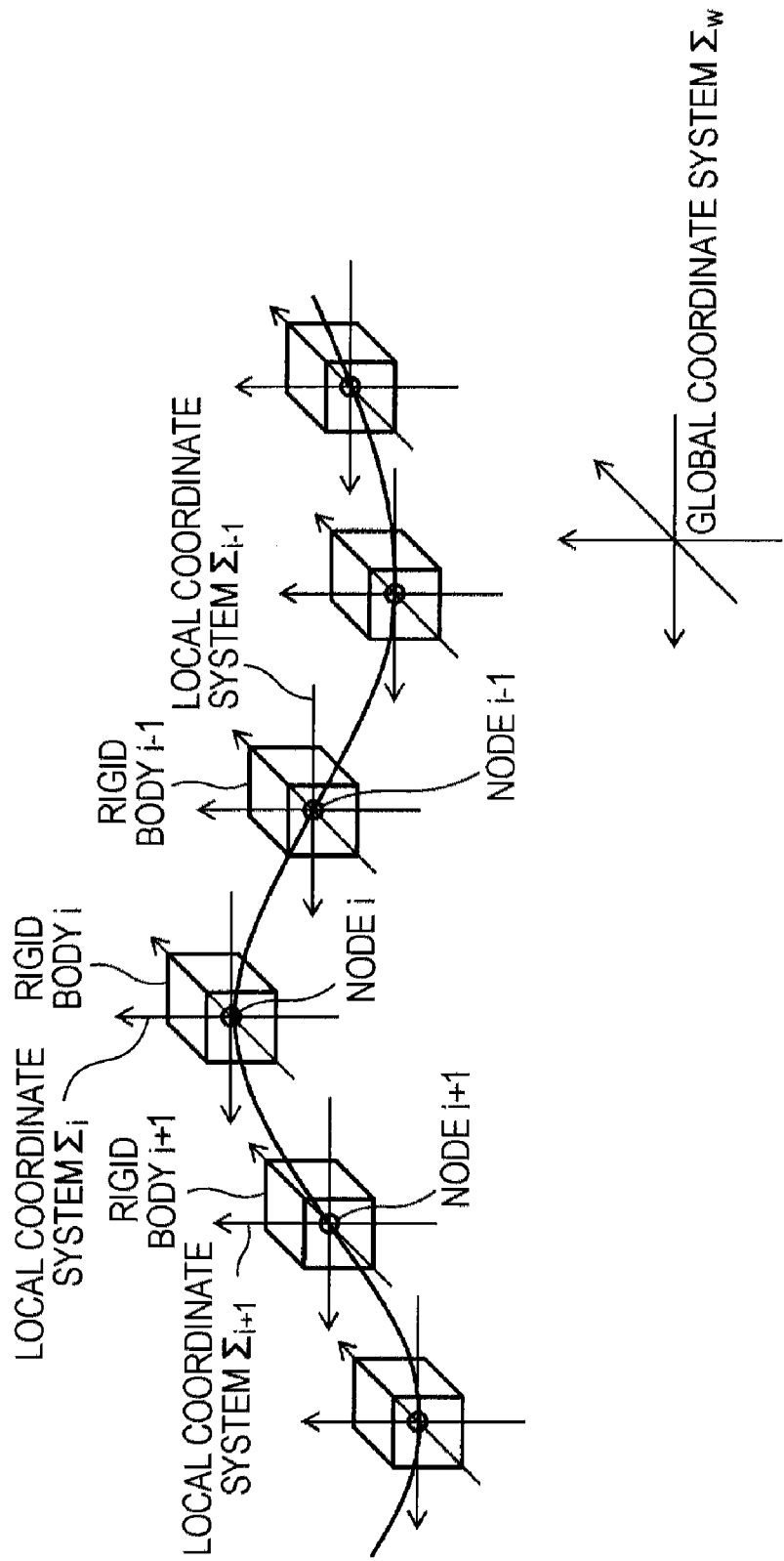
FIG. 4 is a diagram illustrating an example of a multi rigid body system in an initial state.

First, as an initial state of the multi rigid body system dynamics simulation, a path searched for by the RRT algorithm is set as an initial path (described above) of a control target and the positions of the nodes in the initial path are set as initial positions of the representative points of the rigid bodies. Initial postures are properly allocated to the rigid bodies of the nodes to construct a multi rigid body system dynamical model including the initial positions and postures. For example, the initial postures (that is, the local coordinate system of each rigid body) of the rigid bodies of the nodes may be set similarly to the global coordinate system. FIG. 4 shows a multi rigid body system in which the rigid bodies of which the initial posture is set in the global coordinate system are located at the positions of the nodes in the initial path.

It will be described that the center position of each rigid body is set as the representative point of the rigid body and the rigid bodies are configured in the nodes so that the representative points correspond to the positions of the nodes, but the invention is not limited to such a rigid body configuration method. The invention is not limited to the above-mentioned method of allocating the initial posture, but a designer calculating a posture or planning a path using the spline interpolation may set the posture by himself or herself.

In this embodiment, the requirements of (2) to (4) are expressed as dynamical restrictions in an external force model applied to the multi rigid body system, the dynamical restriction is applied to the rigid bodies of the multi rigid body system, and then the multi rigid body system dynamics simulation is carried out. Accordingly, it is possible to generate a path satisfying all the requirements of (1) to (4) for the path planning. That is, by unifying all the requirements in the dimension of force, the problem is solved in combination.

The method of expressing dynamical restriction models of the requirements of (2) to (4) as the most important point of the invention will be sequentially described now.

First, the dynamical restriction model of the requirement (2) "to acquire a smooth position and posture path" will be described.

In FIGS. 2A and 2B and FIGS. 3A and 3B, the control target is shown in a box shape for the purpose of simple explanation. However, the box shape is rare in reality and a control target generally has complex shapes. Depending on the relation between the shortest search distance (distance between the nodes) of the RRT algorithm and an object shape, the neighboring rigid bodies configured at the nodes in the path in the multi rigid body system may overlap with each other. By considering that the shortest search distance is taken to generate a path as smooth as possible, it is rare that the rigid bodies in the multi rigid body system do not overlap with each other. When the requirement "to acquire a smooth position and posture path" is expressed by a dynamical model of a force attracting the neighboring rigid bodies to each other, that is, "inter-rigid-body force", and the rigid bodies overlap with each other, it is difficult to treat the dynamical model.

Therefore, in this embodiment, a "virtual rigid body plane" is defined for each rigid body so as to solve the problem with the overlapping of the rigid bodies in the multi rigid body system in which the rigid bodies are sequentially configured at the nodes (corresponding to the control target) in the path. By virtually treating a rigid body as a plane not having a volume, it is obvious that the neighboring rigid bodies scarcely overlap with each other.

The virtual rigid body plane is fixed to the posture set in each rigid body, that is, the local coordinate system and the relative positional relation to the original rigid body is not changed during the path planning. Here, the virtual rigid body plane can be arbitrarily defined in the local coordinate system of the rigid body and the invention is not limited to the above-mentioned method of defining the virtual rigid body plane.

Figure 5:
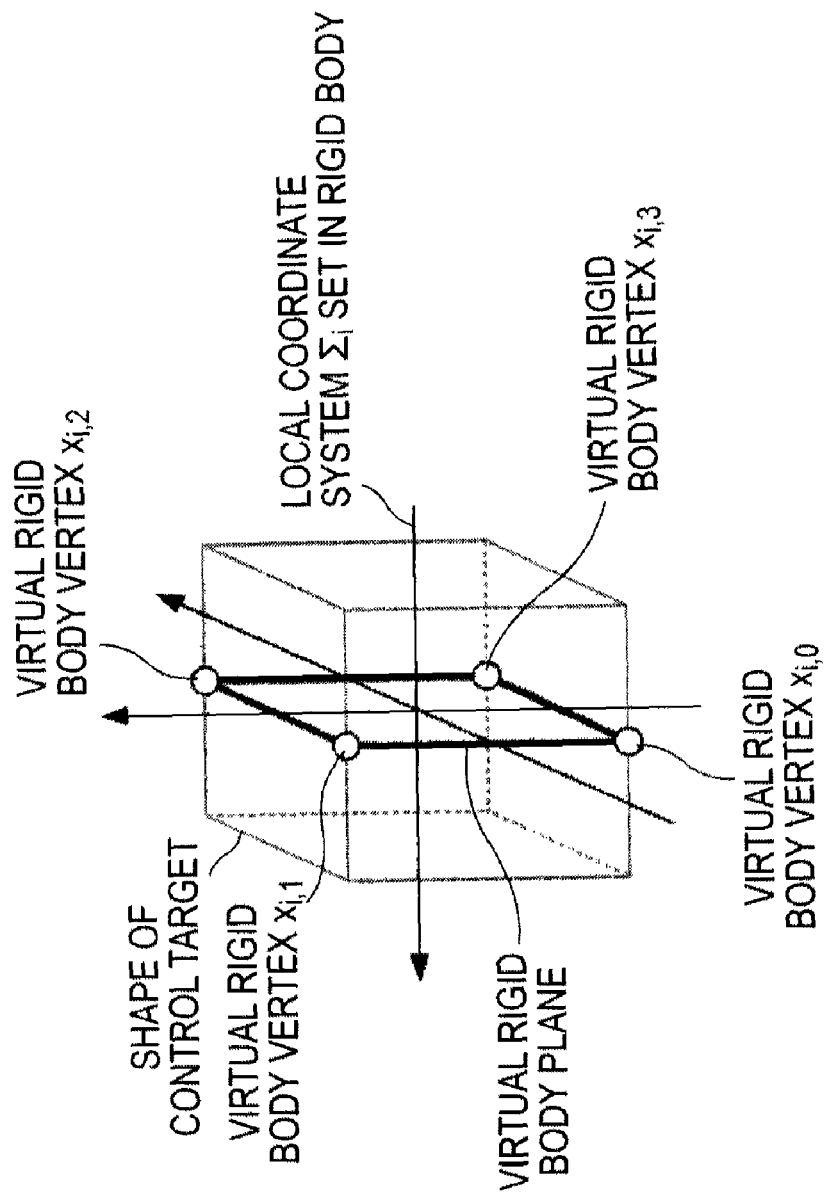
FIG. 5 is a diagram illustrating a virtual rigid body plane defined for a rigid body.

FIG. 5 shows a virtual rigid body plane defined for the i-th rigid body in the planned path. In the examples shown in the drawing, a sectional plane taken by the xy plane of the local coordinate system $\Sigma_i$ of rigid body i is defined as a virtual rigid body plane. The virtual rigid body plane of rigid body i has a rectangular shape and is expressed by four virtual rigid body vertexes $x_{ij}$ (where, j is a serial number indicating the vertexes and is an integer of 0 to 3).

In the multi rigid body system dynamical model, by applying forces between the neighboring rigid bodies as the restriction expression of forces for acquiring a smooth position and posture path, the positions and postures of the rigid bodies are changed and the path is converted into a useful continuous smooth path, whereby the requirement of (2) can be satisfied. When the rigid body configured at each node in the position and posture path is treated as a virtual rigid body plane (see FIG. 5) and the dynamics simulation operation (to be described later) is carried out by applying an inter-rigid-body force for attracting (or repulsing) the neighboring rigid bodies to each other using a dynamical model in which the corresponding vertexes of the neighboring virtual rigid body planes are connected in parallel to each other with springs and dampers, the path is converted into a position and posture path which is useful, continuous, and smooth. Accordingly, it is possible to satisfy the requirement of (2).

Figure 6:
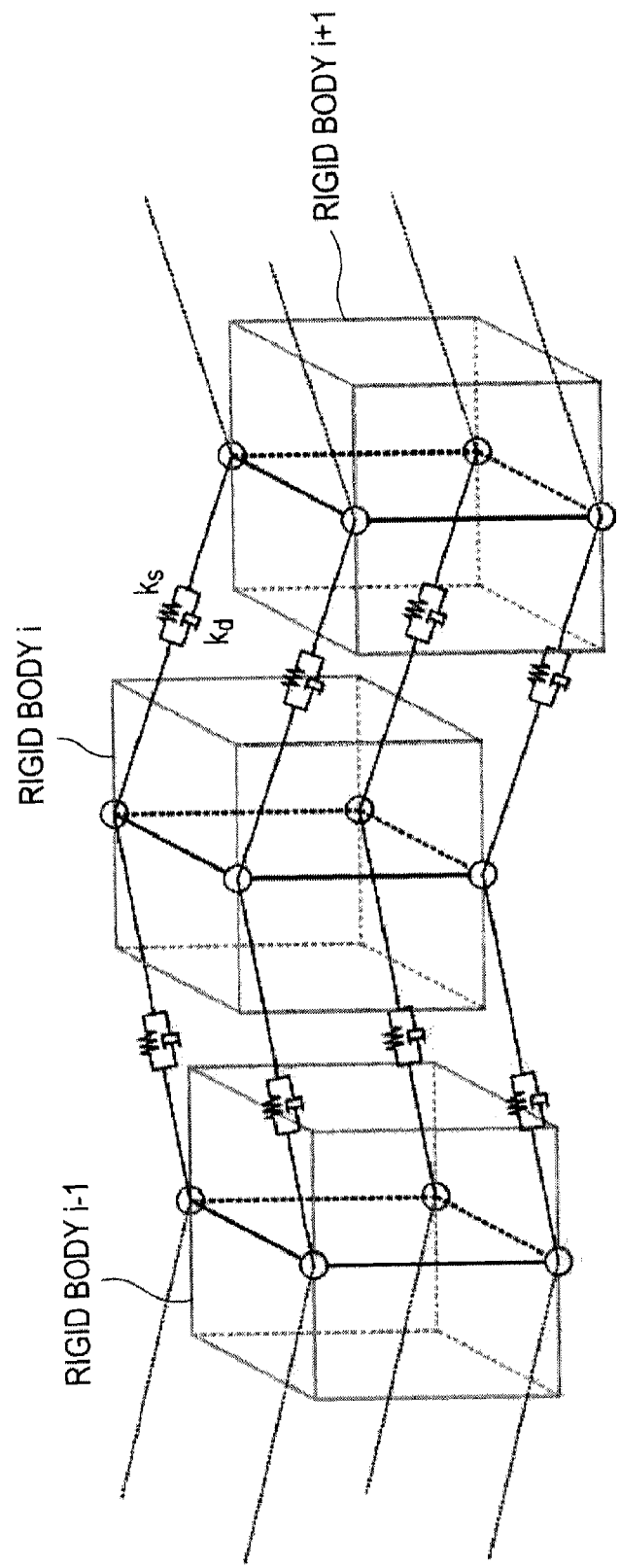
FIG. 6 is a diagram illustrating forces acting between neighboring virtual rigid body planes.

FIG. 6 shows a multi rigid body system dynamical model in which the virtual rigid body vertexes $x_{ij}$ of the i-th rigid body and the virtual rigid body vertexes $x_{i+1,j}$ of the (i+1)-th rigid body adjacent thereto are connected in parallel by springs with a spring constant $k_s$ and dampers with a damping constant $k_d$ (where j=0, 1, 2, 3). Here, at the time of carrying the dynamics simulation, the virtual rigid body vertexes are converted into expressions in the global coordinate system. The spring constant $k_s$ and the damping constant $k_d$ are not uniform in the entire system, but different spring constants and damping constants may be used depending on the nodes i or the vertexes j.

A spring force $f^{i,i+1}_{s,j}$ acting between the neighboring virtual rigid body vertexes $x_{ij}$ and $x_{i+1,j}$ is expressed by Expression 1.

Expression 1

$$f^{i,i+1}_{s,j} = \frac{-r^{i,i+1}_j}{\sqrt{r^{i,i+1T}_j r^{i,i+1}_j}} k^{i,i+1}_{s,j} \left( \sqrt{r^{i,i+1T}_j r^{i,i+1}_j} - l^{i,i+1}_j \right) \quad (1)$$

Here, $l^{i,i+1}_j$ in Expression 1 represents a natural length of a spring between the neighboring virtual rigid body vertexes $x_{ij}$ and $x_{i+1,j}$ and $k^{i,i+1}_{s,j}$ represents a spring constant of a spring connecting the vertexes. $r^{i,i+1}_j$ represents a vector directed from the virtual rigid body vertex $x_{ij}$ to the neighboring corresponding virtual rigid body vertex $x_{i+1,j}$ and is expressed by Expression 2.

Expression 2

$$r^{i,i+1}_j = (x_{i+1,j} - x_{ij}) / |x_{i+1,j} - x_{ij}| \quad (2)$$

The spring force $f^{i,i+1}_{s,j}$ acting between the neighboring virtual rigid body vertexes $x_{ij}$ and $x_{i+1,j}$ due to the spring is expressed by the product of the normalized direction of the spring and the normalized force of the spring as expressed by Expression 1.

On the other hand, the damper force $f^{i,i+1}_{d,j}$ acting between the neighboring virtual rigid body vertexes $x_{ij}$ and $x_{i+1,j}$ due to the damper is expressed by Expression 3. Here, the damping constant of the damper connecting the vertexes to each other is $k^{i,i+1}_{d,j}$ and a velocity vector of the virtual rigid body vertex $x_{ij}$ is $v^{i,i+1}_j$.

Expression 3

$$f^{i,i+1}_{d,j} = \frac{-r^{i,i+1}_j}{\sqrt{r^{i,i+1T}_j r^{i,i+1}_j}} k^{i,i+1}_{d,j} \frac{r^{i,i+1T}_j v^{i,i+1}_j}{\sqrt{r^{i,i+1T}_j r^{i,i+1}_j}} \quad (3)$$

That is, the direction of the damper force is determined from the positions of two neighboring virtual rigid body vertexes and the direction component of the relative velocity determines the magnitude and the plus and minus signs of the damper force.

The spring force $f^{i,i+1}_{s,j}$ and the damper force $f^{i,i+1}_{d,j}$ expressed by Expressions 1 and 3 are forces acting on the j-th virtual rigid body vertex of the i-th rigid body from the j-th virtual rigid body vertex of the (i+1)-th rigid body, but the forces acting on the j-th virtual rigid body vertex of the (i+1)-th rigid body from the j-th virtual rigid body vertex of the i-th rigid body are acquired by inverting the signs of $f^{i,i+1}_{s,j}$ and $f^{i,i+1}_{d,j}$.

The inter-rigid-body force $f^{i,i+1}_n$ acting on the i-th rigid body from the (i+1)-th rigid body is the sum of the spring force $f^{i,i+1}_{s,j}$ and the damper force $f^{i,i+1}_{d,j}$ acting on the virtual rigid body vertexes j of the virtual rigid body plane defined in the rigid body and is expressed by Expression 4.

Expression 4

$$f_n^{i,i+1} = \sum_{j=0}^{3} f_{s,j}^{i,i+1} + \sum_{j=0}^{3} f_{d,j}^{i,i+1} \quad (4)$$

The moment $\tau^{i,i+1}_n$ concerning the origin of the global coordinate system acting on the i-th rigid body due to the inter-rigid-body force $f^{i,i+1}_n$ is the sum of the moments acting on the virtual rigid body vertexes and is expressed by Expression 5.

Expression 5

$$\tau_n^{i,i+1} = \sum_{j=0}^{3} x_{i,j} \times f_{s,j}^{i,i+1} + \sum_{j=0}^{3} x_{i,j} \times f_{d,j}^{i,i+1} \quad (5)$$

The inter-rigid-body forces $f_n^i$ and $\tau_n^i$ acting on the i-th rigid body are the sums of the inter-rigid-body forces and the moments acting from the (i−1)-th and (i+1)-th rigid bodies and are expressed by Expression 6.

Expression 6

$$f_n^i = f_n^{i,i-1} + f_n^{i,i+1}$$

$$\tau_n^i = \tau_n^{i,i-1} + \tau_n^{i,i+1} \quad (6)$$

The inter-rigid-body force $f^{i,i+1}_n$ changes the position of the rigid body i and the moment $\tau^{i,i+1}_n$ acting between the neighboring rigid bodies changes the posture of the rigid body i. That is, the repulsive force $f_p^i$ and the moment $\tau_p^i$ acting on the rigid body i from the neighboring rigid bodies (i−1) and (i+1) are the dynamical restriction expression of the requirement of (4). By applying the inter-rigid-body forces and the moments to the rigid bodies configured at the nodes in the planned path, it should be understood that a smooth position and posture path is obtained and the requirement of (2) is satisfied.

Subsequently, the dynamical restriction expression of the requirement of (3) "to avoid the infiltration between objects in the position and posture path" will be described.

In the multi rigid body system dynamical model, by applying the repulsive force corresponding to the shortest distance between the control target and the obstruction to the rigid bodies as the restriction expression of the forces given to avoid the infiltration between objects and carrying out the multi rigid body system dynamics simulation, the positions and postures of the rigid bodies are changed to obtain a position and posture path which is useful, continuous, and smooth, whereby the requirement of (3) can be satisfied.

In the course of carrying out the multi rigid body system dynamics simulation, an inter-object interference detecting function based on the GJK algorithm (described above) is started to calculate the shortest distance between the control target and the obstruction. Here, when the representative collision point pair, that is, the point in the obstruction and the point in the control target forming the shortest distance, is $X^o_{near}(x^o_{near}, y^o_{near}, z^o_{near})$ and $x^r_{near}(x^r_{near}, y^r_{near}, z^r_{near})$, the repulsive potential between the control target and the obstruction is expressed by the Gaussian function of Expression 7. Here, $k_p$ in the expression is a constant representing the magnitude of the potential and $\sigma$ is a constant representing the reach of the potential.

Expression 7

$$U(x^r_{near}, y^r_{near}, z^r_{near}) = k_p \cdot \exp\left(-\frac{(x^r_{near} - x^o_{near})^2 + (y^r_{near} - y^o_{near})^2 + (z^r_{near} - z^o_{near})^2}{\sigma^2}\right) \quad (7)$$

Here, the artificial repulsive force $f_p^i$ acting on the point $x^r_{near}(x^r_{near}, y^r_{near}, z^r_{near})$ in the control target (the rigid body configured at the i-th node in the path) is expressed by Expression 8.

Expression 8

$$f_{p,near}^i = \begin{bmatrix} f_{p,near_x}^i \\ f_{p,near_y}^i \\ f_{p,near_z}^i \end{bmatrix} \quad (8)$$

$$= -k \cdot \nabla U(x^r_{near}, y^r_{near}, z^r_{near})$$

$$= \left[ -\frac{\partial U}{\partial x^r_{near}} \; -\frac{\partial U}{\partial y^r_{near}} \; -\frac{\partial u}{\partial z^r_{near}} \right]^T$$

$$= \begin{bmatrix} 2k_p \frac{x^r_{near} - x^o_{near}}{\sigma^2} \exp\left(-\frac{(x^r_{near} - x^o_{near})^2 + (y^r_{near} - y^o_{near})^2 + (z^r_{near} - z^o_{near})^2}{\sigma^2}\right) \\ 2k_p \frac{y^r_{near} - y^o_{near}}{\sigma^2} \exp\left(-\frac{(x^r_{near} - x^o_{near})^2 + (y^r_{near} - y^o_{near})^2 + (z^r_{near} - z^o_{near})^2}{\sigma^2}\right) \\ 2k_p \frac{z^r_{near} - z^o_{near}}{\sigma^2} \exp\left(-\frac{(x^r_{near} - x^o_{near})^2 + (y^r_{near} - y^o_{near})^2 + (z^r_{near} - z^o_{near})^2}{\sigma^2}\right) \end{bmatrix}$$

The precise interference detecting operation and the shortest distance calculating operation are used in Expression 8, but the center positions $x_i$ and $x^o_c$ (expressed in the global coordinate system) may be used instead of the point in the control target (rigid body i) and the point in the obstruction constituting the shortest distance so as to reduce the calculation amount. In the latter, the artificial repulsive force $f_{p,near}^i$ acting on the point $X^r_{near}(x^r_{near}, y^r_{near}, z^r_{near})$ in the control target (the rigid body configured at the i-th node in the path) is expressed by Expression 9.

Expression 9

$$f_p^i = \begin{bmatrix} f_{p_x}^i \\ f_{p_y}^i \\ f_{p_z}^i \end{bmatrix} \quad (9)$$

$$= -k \cdot \nabla U(x_i, y_i, z_i)$$

$$= \left[ -\frac{\partial U}{\partial x_i} \; -\frac{\partial U}{\partial y_i} \; -\frac{\partial U}{\partial z_i} \right]^T$$

$$= \begin{bmatrix} 2k_p \frac{x_i - x^o_c}{\sigma^2} \exp\left(-\frac{(x_i - x^o_c)^2 + (y_i - y^o_c)^2 + (z_i - z^o_c)^2}{\sigma^2}\right) \\ 2k_p \frac{y_i^r - y^o_c}{\sigma^2} \exp\left(-\frac{(x_i^r - x^o_c)^2 + (y_i^r - y^o_c)^2 + (z_i^r - z^o_c)^2}{\sigma^2}\right) \\ 2k_p \frac{z_i^r - z^o_c}{\sigma^2} \exp\left(-\frac{(x_i^r - x^o_c)^2 + (y_i^r - y^o_c)^2 + (z_i^r - z^o_c)^2}{\sigma^2}\right) \end{bmatrix}$$

In Expression 9, $(x^o{}_c, y^o{}_c, z^o{}_c)^T$ is the gravity center position of the obstruction and represents the center of the potential.

The moment $\tau^i_p$ about the origin of the world coordinate system acting on the control target (the rigid body configured at the i-th node in the path) due to the repulsive force $f^i_p$ is expressed by Expression 10.

Expression 10

$$\tau_p{}^i = x_i \times f_p{}^i \tag{10}$$

The artificial repulsive force $f^i_p$ changes the position of the rigid body i and the moment $\tau^i_p$ acting on the rigid body i due to the repulsive force changes the posture of the rigid body. That is, the repulsive force $f^i_p$ and the moment $\tau^i_p$ acting on the rigid body i depending on the distance between the control target and the obstruction are the dynamical restriction expressions of the requirement of (3). In this way, by causing the repulsive force and the moment to act on the rigid bodies configured at the nodes in the planned path, it should be understood that the position and posture path avoiding the infiltration between the objects is obtained to satisfy the requirement of (3).

The dynamical restriction expression of the requirement of (4) "to approach an ideal position and posture path as close as possible" will be described now.

In this embodiment, an ideal posture path of a control target is defined as "causing the forward moving directions of rigid bodies configured at the nodes in the path to follow the path as much as possible". Here, the forward moving directions of the rigid bodies are fixed to the local coordinate systems of the rigid bodies. Here, the invention does not limit the forward moving direction of each rigid body to a specific direction in the local coordinate system of the rigid body, but any direction may be determined as the forward moving direction as long as it is fixed to the local coordinate system.

Figure 7:
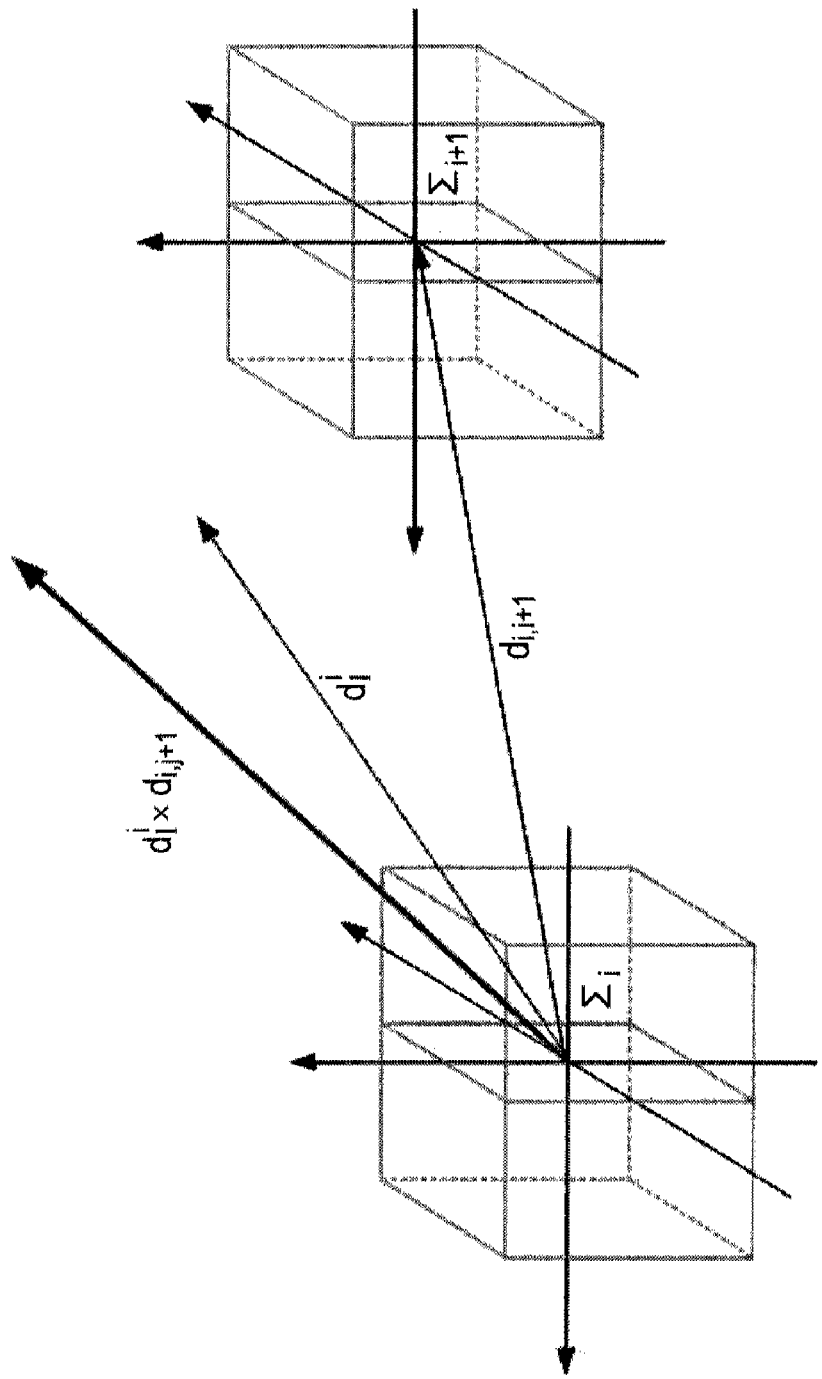
FIG. 7 is a diagram illustrating a dynamical model for realizing an ideal posture path of a control target.

FIG. 7 shows a dynamical model when the ideal posture path of the control target is defined as described above. The dynamical restriction expression of "to approach an ideal position and posture path as close as possible" will be described now in detail with reference to the drawing.

For the purpose of simple explanation, it is assumed that the local coordinate system $\Sigma_i$ is established so that the gravity center position which is the representative point of the rigid body i configured at each node in the position and posture path is set as an origin. It is also assumed that the forward moving direction of the rigid body i is a direction $d^i_1$ fixed using the origin of the local coordinate system $\Sigma_i$ as a start point.

In the multi rigid body system dynamical model, when the gravity center positions of the i-th and (i+1)-th rigid bodies are $x_i$ and $x_{i+1}$, respectively, the direction $d_{i,i+1}$ of the position and posture path between the neighboring rigid bodies is expressed by Expression 11.

Expression 11

$$d_{i,i+1} = (x_{i+1} - x_i)/|x_{i+1} - x_i| \tag{11}$$

According to the above-mentioned definition of the ideal position and posture path, the direction $d_{i,i+1}$ directed from the rigid body i to the rigid body (i+1) and expressed by Expression 11 is the ideal position and posture path in the forward moving direction $d^i_1$ of the rigid body i.

At this time, the spring force, which is obtained by multiplying a spring constant $k_\tau$ by the angle formed by the direction directed from the rigid body i to the rigid body (i+1) and the forward moving direction $d^i_1$ fixed to the local coordinate system of the rigid body i, is added as a force around an outer product direction of $d_{i,i+1}$ and $d^i_1$ to the multi rigid body system dynamical model, whereby the dynamical restriction for approaching the ideal posture path as close as possible is expressed. That is, the moment $\tau^i_o$ acting to approach the ideal path is expressed by Expression 12.

Expression 12

$$\tau_o{}^i = k_\tau{}^i a \tan 2(|d_{i,i+1} \times d_l{}^i|, d_{i,i+1} \cdot d_l{}^i) \cdot (d_{i,i+1} \times d_l{}^i / |d_{i,i+1} \times d_l{}^i|) \tag{12}$$

In Expression 12, $k_\tau$ is treated as a constant, but may be treated as a variable. For example, $k_\tau$ may be treated as a variable varying depending on the distance from the initial state (the rigid body O corresponding to the present position of the control target) to the rigid body i or the distance from the rigid body i to the target state (the rigid body N corresponding to the target position of the control target). In this way, by treating $k_\tau$ as a variable varying depending on the distance, it is easy to hold the consistency in combination with another dynamical restriction, thereby obtaining a smoother path.

The force $f^i_o$ acting on the rigid body i to approach the ideal path as close as possible is 0 as expressed by Expression 13.

Expression 13

$$f_o{}^i = 0 \tag{13}$$

In the dynamical restriction expression of the requirement of (4), a force based on the viscosity resistance such as air resistance is also introduced to control the convergence of the multi rigid body system dynamics simulation. When the velocity of the rigid body i is $v^i_c$ and the viscosity coefficient acting on the rigid body is $k^i_c$, the force $f^i_d$ based on the viscosity resistance acting on the rigid body i is expressed by Expression 14.

Expression 14

$$f_v{}^i = -k_v{}^i v_c{}^i \tag{14}$$

The moment about the origin of the world coordinate system due to the viscous force $f^i_d$ expressed by Expression 14 is expressed by Expression 15.

Expression 15

$$\tau_v{}^i = -x_i \times k_v{}^i v_c{}^i \tag{15}$$

The forces and torques expressing the dynamical restriction of the requirements of (2) to (4) and acting on the rigid body i in the multi rigid body system dynamical model have been described. The total external force $F_i$ obtained by summing the external forces acting on the rigid body i is expressed by Expression 16.

Expression 16

$$F_i = \begin{bmatrix} f_i \\ \tau_i \end{bmatrix} = \begin{bmatrix} f_n^i \\ \tau_n^i \end{bmatrix} + \begin{bmatrix} f_p^i \\ \tau_p^i \end{bmatrix} + \begin{bmatrix} f_o^i \\ \tau_o^i \end{bmatrix} + \begin{bmatrix} f_v^i \\ \tau_v^i \end{bmatrix} \tag{16}$$

As expressed by Expressions 17 and 18, six independent equations describing the motion of the rigid body i are given as the Newton's equation of motion and the Euler's equation of motion.

Expression 17

$$f_i = \frac{d}{dt} P_i = m_i \ddot{x}_i \tag{17}$$

-continued

Expression 18

$$\tau_i = \frac{d}{dt} L_i = I_i \dot{\omega}_i + \omega_i \times I_i \omega_i \qquad (18)$$

In Expression 17, $P_i$ and $m_i$ represent the momentum and the mass of the rigid body i, respectively. In Expression 18, $L_i$, $I_i$, and $\omega_i$ represent the angular momentum of the rigid body i, the inertia tensor in the world coordinate system, the angular velocity vector, respectively.

The total external force $F_i=[f_i,\tau_i]^T$ acting on the rigid body i and being expressed by Expression 16 is added as the external force of the Newton's equation of motion and the Euler's equation of motion expressed by Expressions 17 and 18 and then the multi rigid body dynamics simulation is carried out.

That is, by expressing the coupled motion of N rigid bodies as N equations of rigid body motion and carrying out the numerical integration in the simulation steps, it is possible to acquire the position and posture of the rigid body i at each time, that is, at each node. As a result, the path planning satisfying all the requirements of (1) to (4) is realized to accomplish the purpose of rapidly generating a smooth path from the present position and posture of the control target and the target position and posture.

Figure 8:
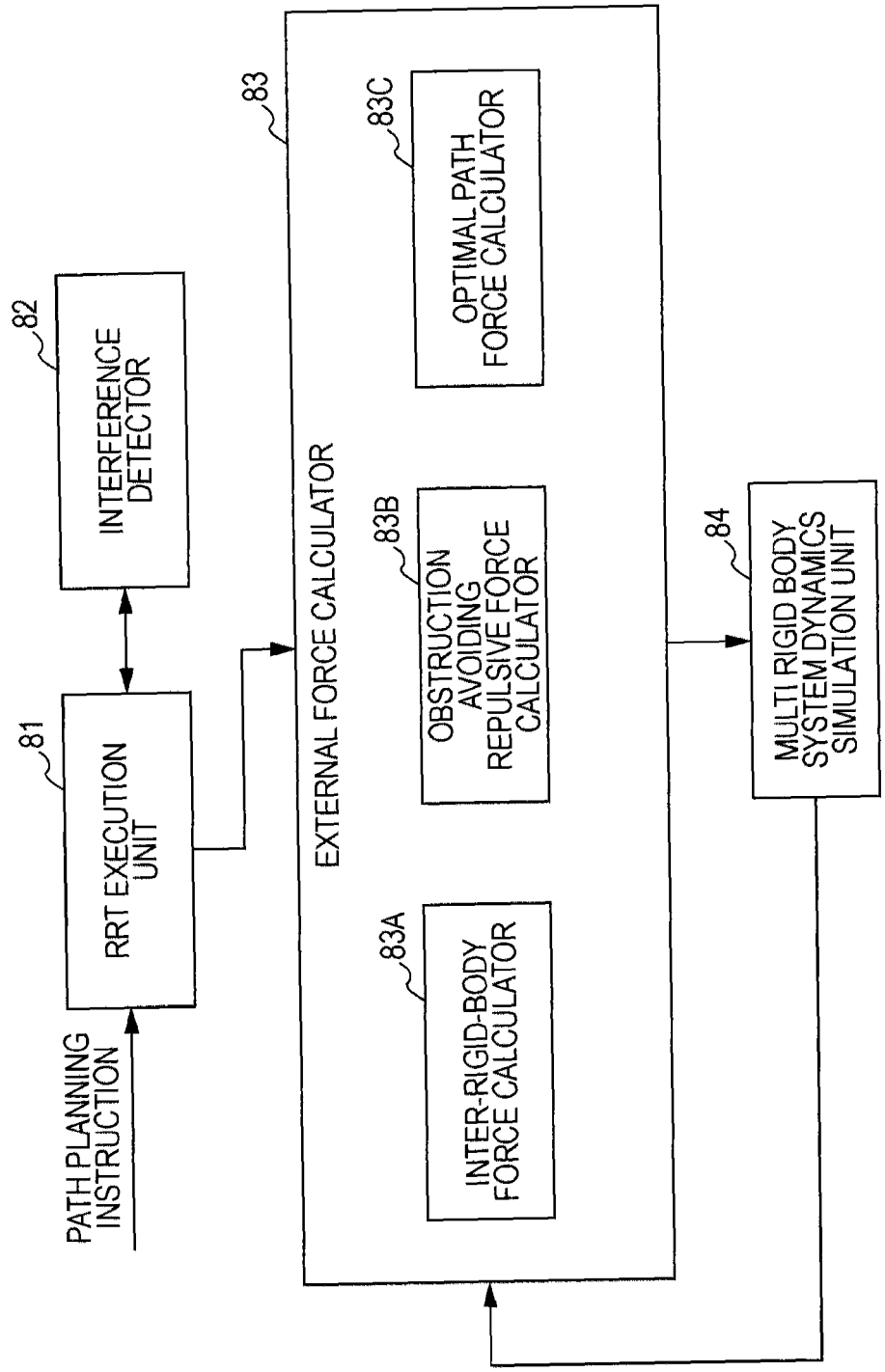
FIG. 8 is a diagram schematically illustrating a functional configuration of a system embodying the path planning of a control target.

FIG. 8 schematically shows the function configuration of a system realizing the above-mentioned path planning of a control target. The shown system includes an RRT execution unit 81, an interference detector 82, an external force calculator 83, and a multi rigid body system dynamics simulation unit 84.

When receiving a path planning instruction, the RRT execution unit 81 searches for or generates a path, which is the minimum purpose, from the present position and posture to the target position and posture using the RRT algorithm on the basis of obstruction information in the three-dimensional space and the present position and posture and the target position and posture of a control target object. The initial position and posture path acquired by the RRT execution unit 81 includes plural nodes between the present position and posture of the control target and the target position and posture thereof.

The interference detector 82 performs an interference detecting operation when the RRT execution unit 81 searches for or generates the initial position and posture path of the control target, and considers the avoidance of the infiltration between the control target and the obstruction at the time of searching for or generating the path. Therefore, the initial position path of the control target output from the RRT execution unit 81 includes many detours but has no interference with the obstruction. The GJK algorithm (described above) can be used to solve the infiltration between objects at the time of avoiding the obstruction.

The external force calculator 83 calculates the external forces expressing the requirements for correcting the position and posture path while avoiding the interference with the obstruction for the rigid body corresponding to the control target configured at each node in the initial position and posture path of the control target searched for or generated by the RRT execution unit 81. In this embodiment, the external force calculator 83 includes an inter-rigid-body force calculator 83A calculating an inter-rigid-body force as a dynamical restriction for correcting the initial position and posture path into a smooth position and posture path without any detour, an obstruction avoiding repulsive force calculator 83B calculating an obstruction avoiding repulsive force as a dynamical restriction for avoiding the interference of the control target with the obstruction existing in the motion space, and an optimal path force calculator 83C calculating an optimal path force as a dynamical restriction for approaching an ideal position and posture path as close as possible.

The multi rigid body system dynamics simulation unit 84 causes the external forces (that is, the inter-rigid-body force, the obstruction avoiding repulsive force, and the optimal path force) acting on each rigid body in the path and being calculated by the external force calculator 83 to serve as the external force restrictions of the rigid body motions and performs the multi rigid body system dynamics operation every simulation cycle.

The multi rigid body system dynamics operation performed by the multi rigid body system dynamics simulation unit 84 is ended when the path is convergent to the set state (for example, the correction of the rigid body), and the node sequence formed by the multi rigid body system is output as the smoothed target position and posture path.

Figure 9:
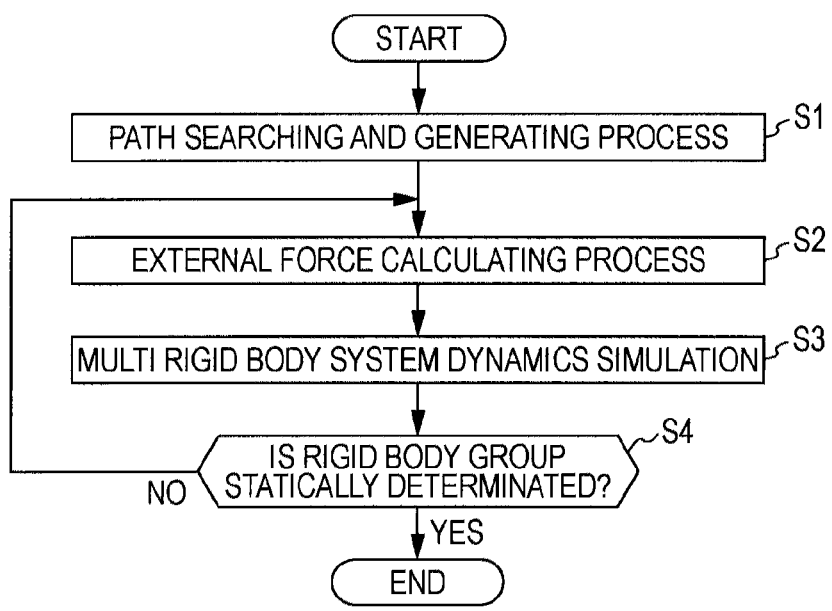
FIG. 9 is a flowchart illustrating a sequence of processes of realizing the path planning of a control target in the system shown in FIG. 8.

FIG. 9 shows a flowchart illustrating the flow of processes of realizing the path planning of the control target in the system shown in FIG. 8.

First, as a path searching and generating process, the RRT execution unit 81 receives the path planning instruction and searches for or generates the path, which is the minimum purpose, from the present position and posture to the target position and posture (step S1) on the basis of the obstruction information in the three-dimensional space and the present position and posture and the target position and posture of the control target. The generated initial position and posture may include detours.

Then, the external force calculator 83 performs the process of calculating the external forces expressing the dynamical restrictions for realizing the path smoothing, the obstruction interference avoiding, and the attraction to an ideal path every simulation cycle (step S2).

The multi rigid body system dynamics simulation unit 84 performs the multi rigid body system dynamics operation every simulation cycle and updates the state of the multi rigid body system (that is, the position and posture of each node in the path of the control target) (step S3).

Until the position and posture path of the control target is convergent to a predetermined static state, the processes of steps S2 to S4 are repeated from step S2.

When the multi rigid body system is convergent to the set state, the dynamics operation of the multi rigid body system dynamics simulation unit 84 is ended and the entire path generating process is ended. As a result, the position and posture path of the control target is generated, which has no interference with the obstruction, is smoothed, and is close to an ideal path.

Figure 10:
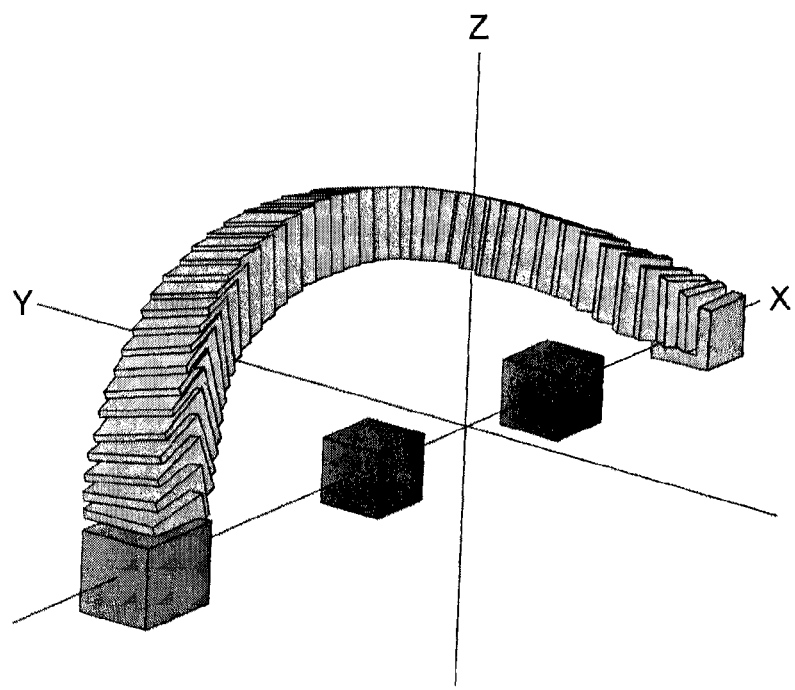
FIG. 10 is a diagram illustrating the correction result of an initial path acquired by the RRT algorithm shown in FIG. 3 using a multi rigid body system dynamics simulation.

FIG. 10 shows the correction result of the initial path acquired by the RRT algorithm shown in FIG. 3 using the multi rigid body system dynamics simulation. It can be confirmed that the acquired path of the control target is smooth in position and posture and avoids the interference with the obstruction.

Figure 11:
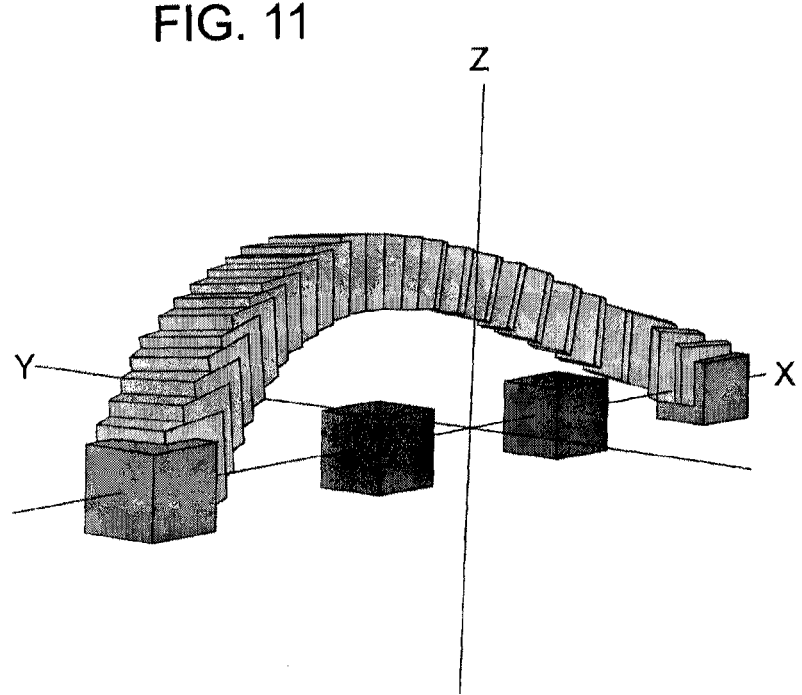
FIG. 11 is a diagram illustrating another example of a path corrected using the multi rigid body dynamical simulation.
Figure 12:
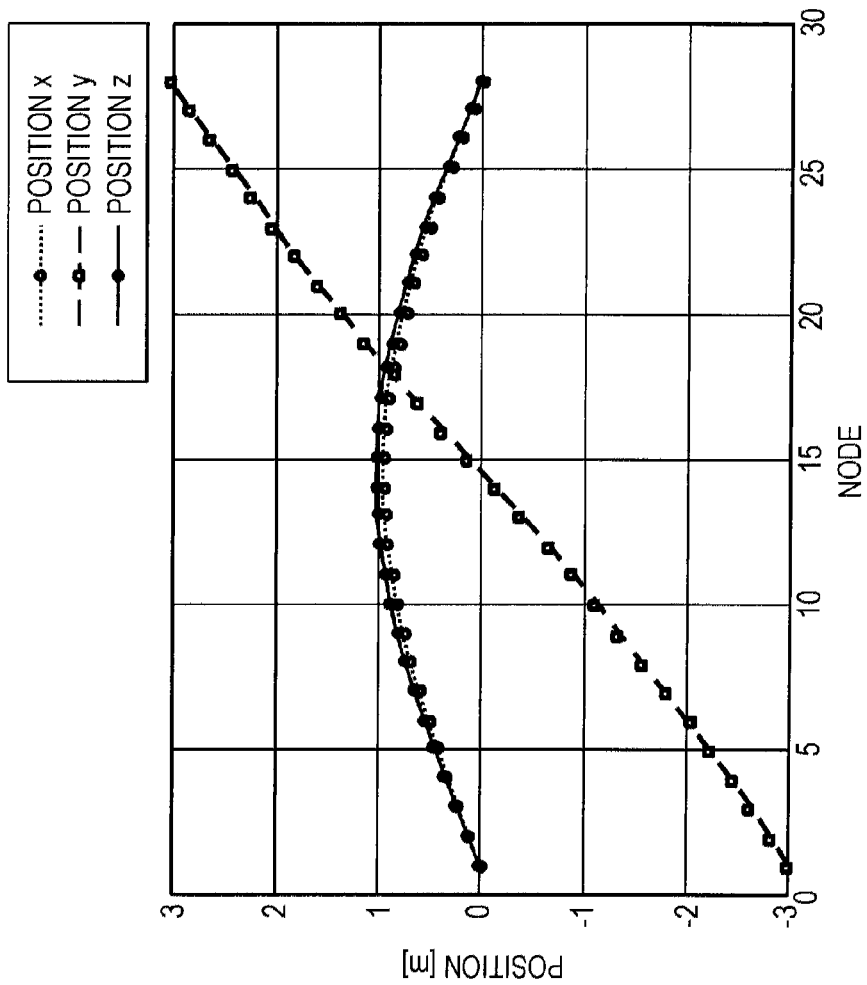
FIG. 12 is a graph illustrating positions of the rigid body in the path shown in FIG. 11.

FIG. 11 shows another example of the path corrected using the multi rigid body system dynamics simulation. FIG. 12 shows the positions of the rigid bodies in the path shown in FIG. 11. It can be seen from FIG. 12 that the path of all x, y, and z is corrected into a smooth and useful path.

Figure 13:
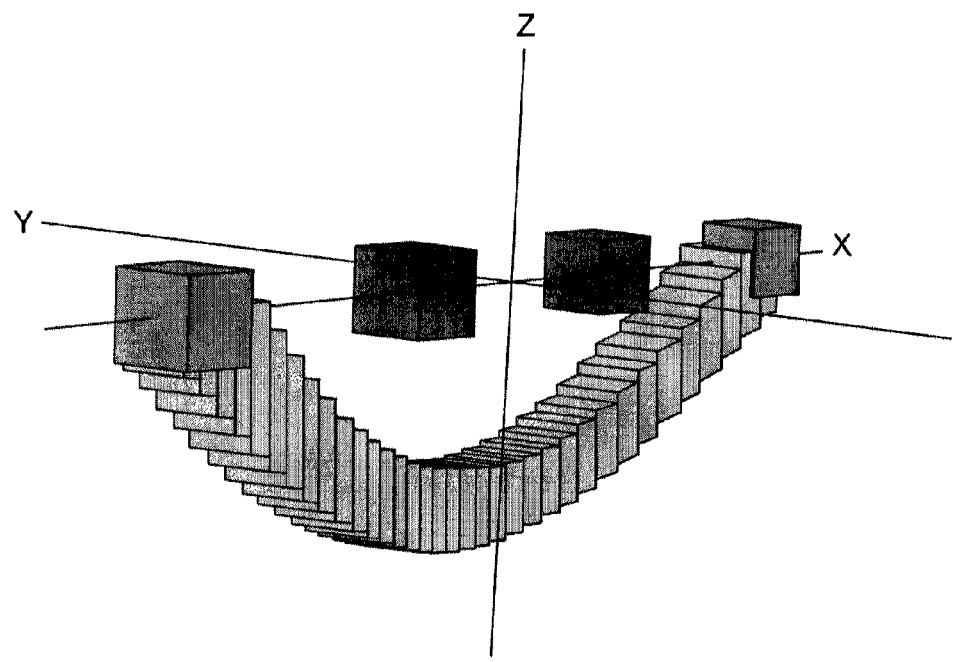
FIG. 13 is a diagram illustrating another example of a path corrected using the multi rigid body dynamical simulation.
Figure 14:
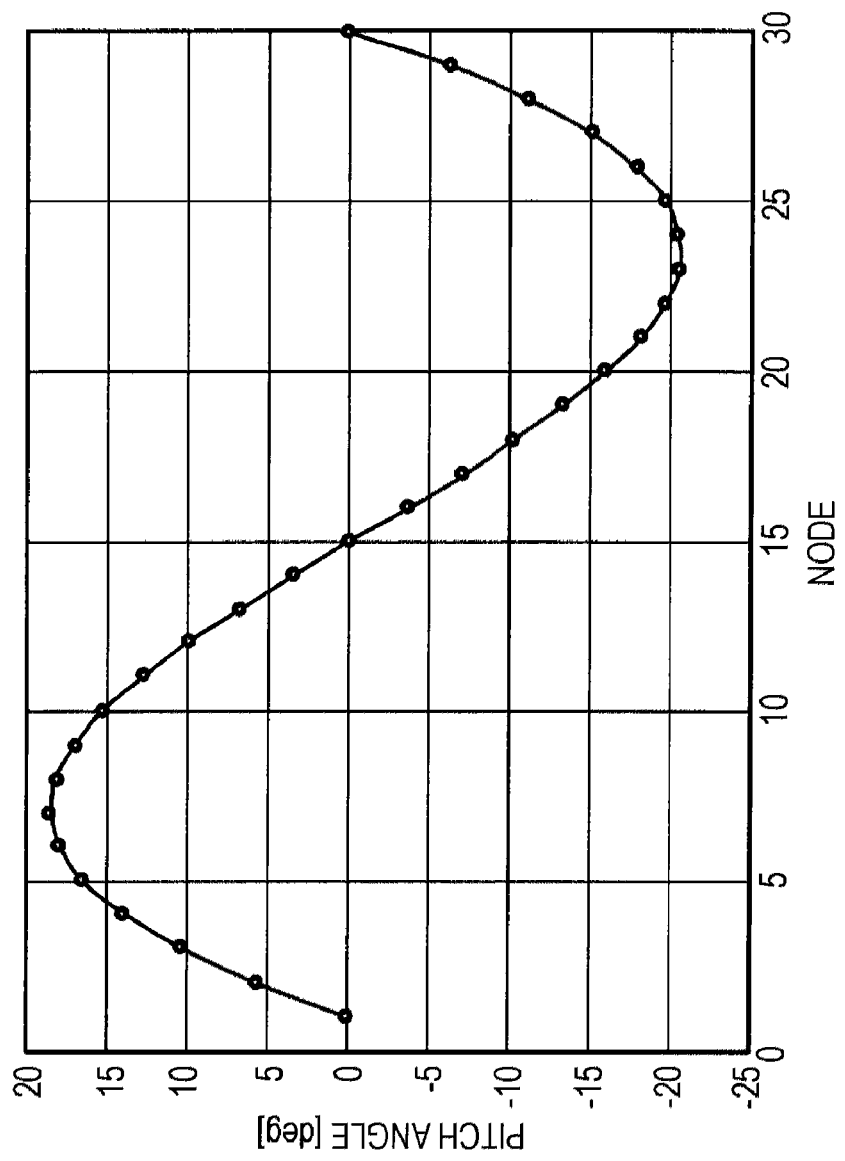
FIG. 14 is a diagram illustrating pitch angles of the posture of the rigid body in the path shown in FIG. 13.

FIG. 13 shows another example of the path corrected using the multi rigid body system dynamics simulation. FIG. 14 shows the pitch angles of the rigid body postures in the path shown in FIG. 13. It can be seen from FIG. 14 that the rigid body posture path is corrected into a smooth and useful path.

In this embodiment, the spring force is made to act between the neighboring rigid bodies (as described above) as the dynamical restriction expression of the requirement of (2) "to acquire a smooth position and posture path". Here, the spring constant $k_s$ may be set to be uniform all over the system, that is, a constant, or may be set to a variable varying depending on the distance from the rigid body O in the present state or the rigid body N in the target state.

Figure 15:
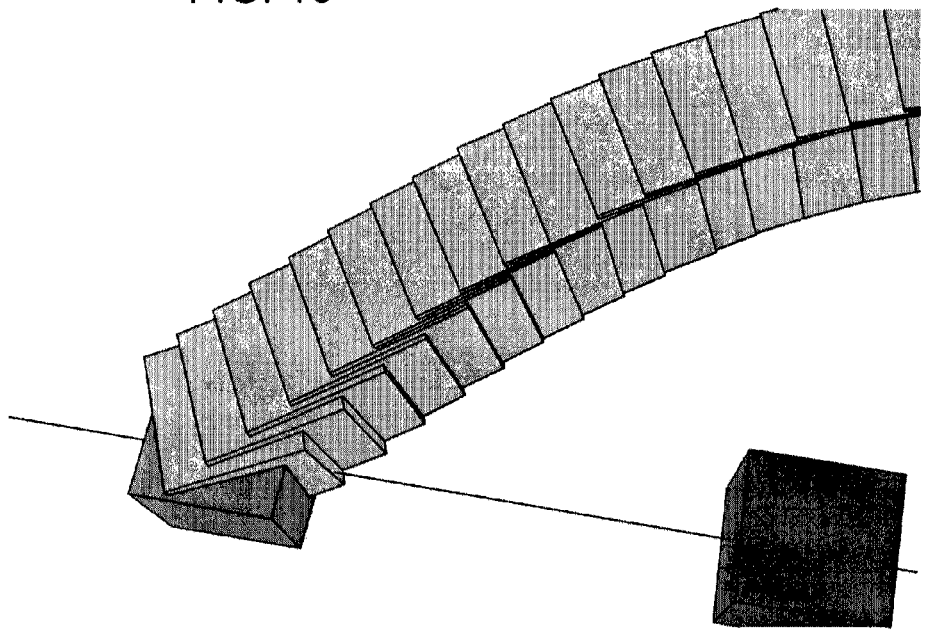
FIG. 15 is a diagram illustrating a snapshot of the path generation result of another rigid body system dynamics model where a spring constant is constant.
Figure 16:
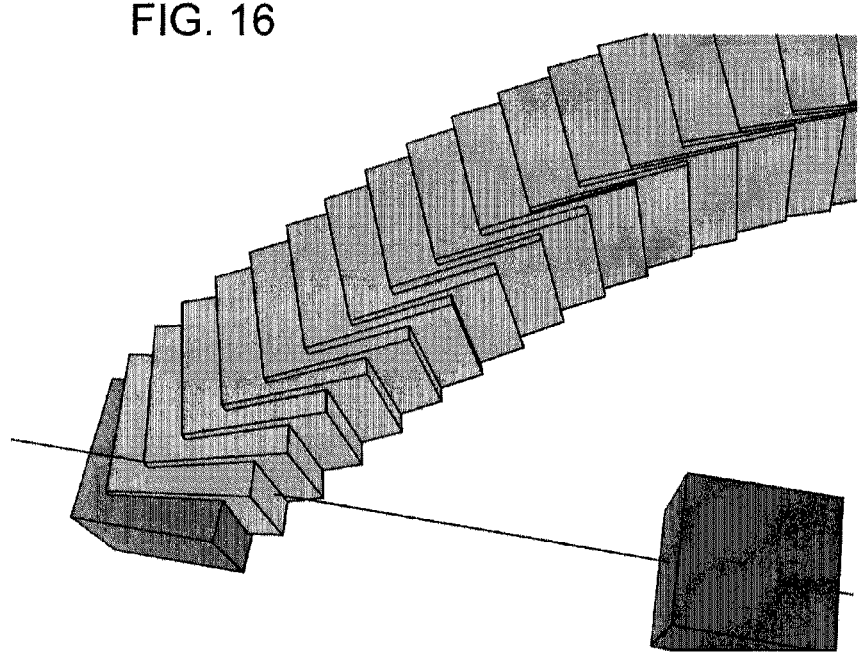
FIG. 16 is a diagram illustrating a snapshot of the path generation result where the spring constant is variable varying according to a distance between rigid body i and rigid body O (present state) or rigid body N (target state).
Figure 17:
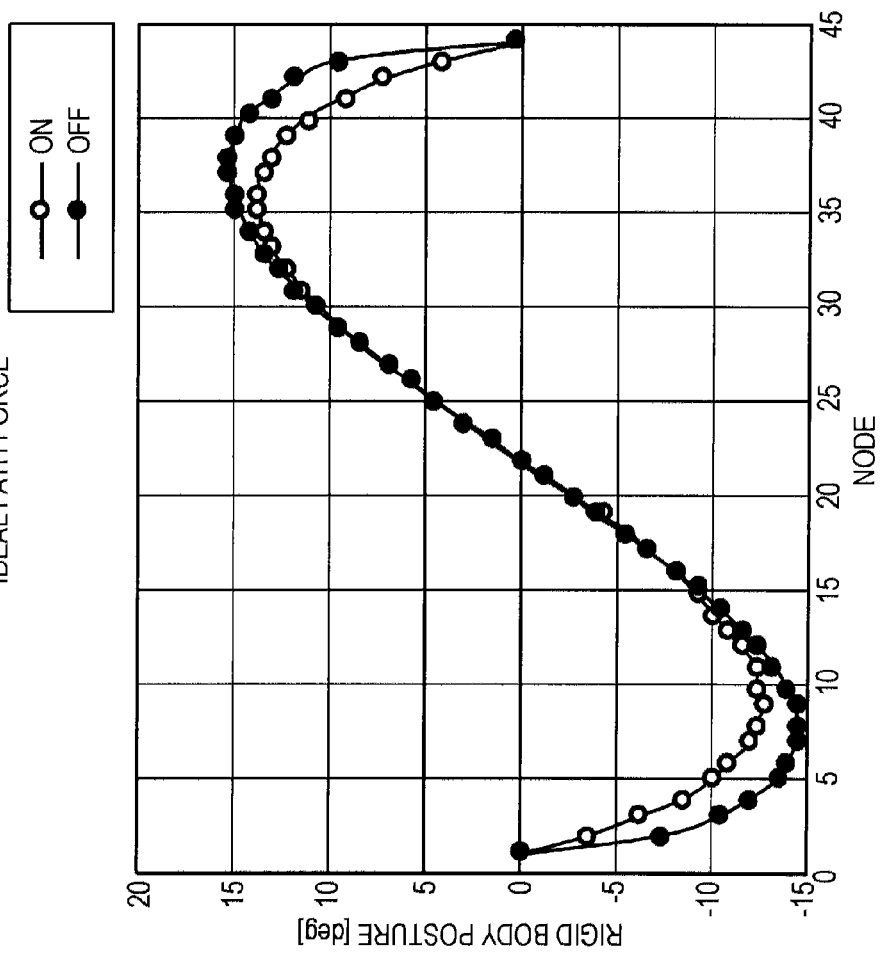
FIG. 17 is a graph illustrating rigid body postures of the rigid bodies (nodes) in the paths generated when the spring constant is constant and variable.

FIG. 15 shows a snapshot of the path generation result of the multi-rigid body system dynamical model where the spring constant is a constant. FIG. 16 shows a snapshot of the path generation result where the spring constant is not a constant but a variable varying depending on the distance between the rigid body i and the rigid body O in the present state or the rigid body N in the target state. FIG. 17 shows a graph illustrating the rigid body postures of the rigid bodies (nodes) in the paths generated when the spring constant is set to a constant and a variable. In FIG. 17, the curve plotted by black circles represents the variation of the rigid body posture when the spring constant is set to a constant (that is, corresponding to FIG. 15) and the curve plotted by white circles represents the variation of the rigid body posture when the spring constant is set to a variable depending on the distance (that is, corresponding to FIG. 16). It can be seen from FIG. 17 that the path is smoother and less sharp when the spring constant is set to a variable depending on the distance.

Figure 18:
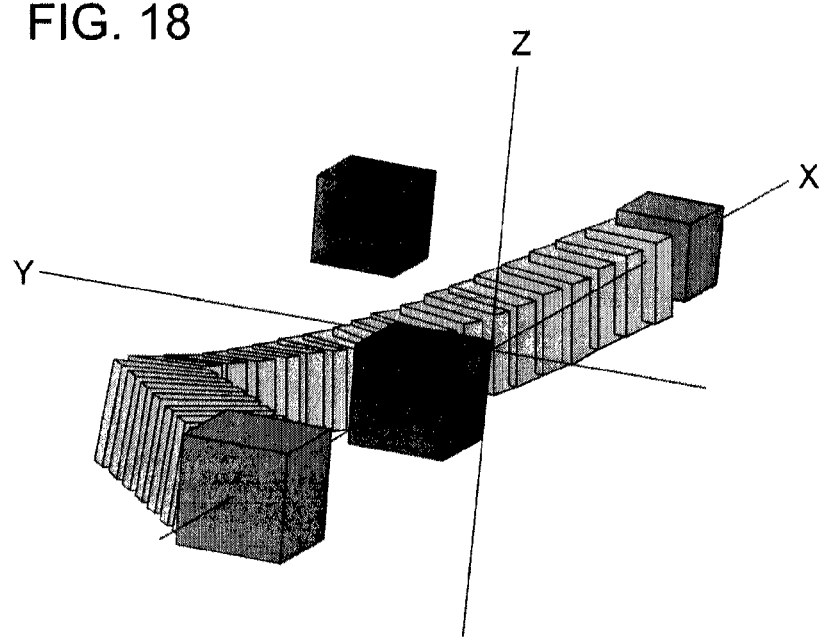
FIG. 18 is a diagram illustrating the result of the multi rigid body system dynamics simulation where the control target moves to the deeper obstruction in the drawing from the initial state shown in FIG. 3.

In this embodiment, the repulsive force corresponding to the shortest distance between the control target and the obstruction is made to act on the rigid bodies (as described above) as the dynamical restriction expression of the requirement of (3) "to avoid the infiltration between objects in the position and posture path". FIG. 18 shows the result of the multi rigid body system dynamics simulation when the obstruction moves to the deeper side in the drawing from the initial state shown in FIG. 3. It can be seen from the drawing that the generated path is being corrected with the movement of the obstruction.

In this embodiment, the requirements of (2) to (4) are expressed as the dynamical restrictions acting on the rigid bodies and the total external force obtained by summing the external forces acting on the rigid bodies is added as the external force of the equations of motion, whereby the multi rigid body system dynamics simulation is carried out.

Figure 19:
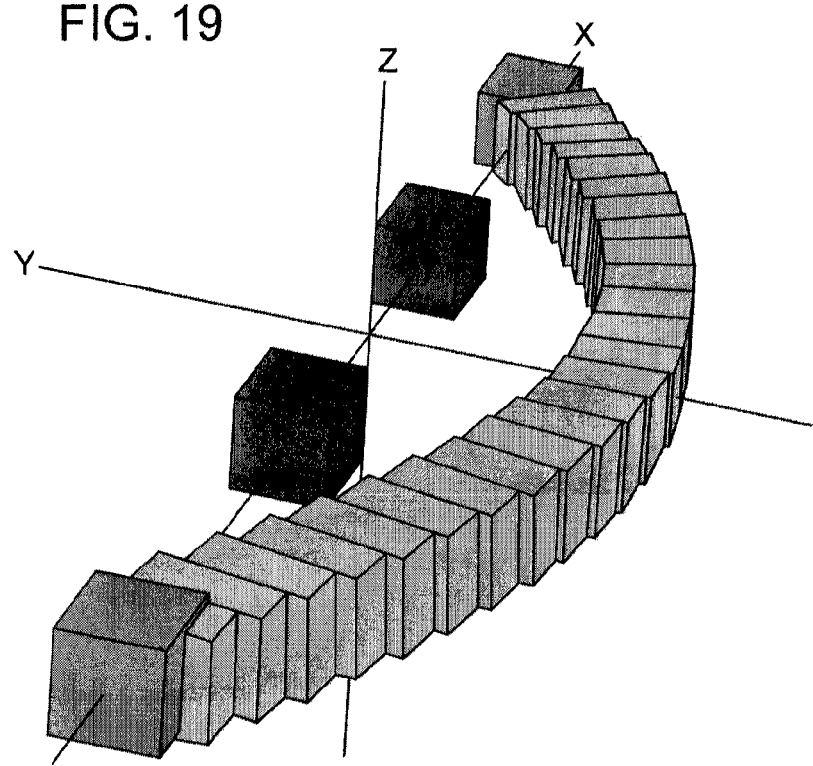
FIG. 19 is a diagram illustrating a state where the multi rigid body system dynamics simulation is carried out and a rigid body group is statically determinated.
Figure 20:
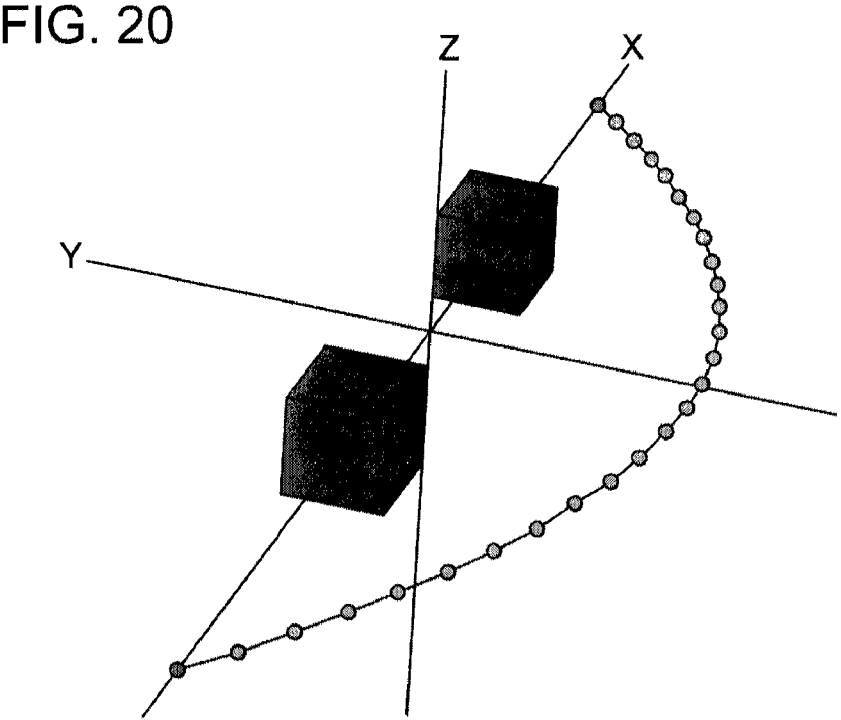
FIG. 20 is a diagram illustrating a state where the multi rigid body system dynamics simulation is carried out and a rigid body group is statically determinated.
Figure 21:
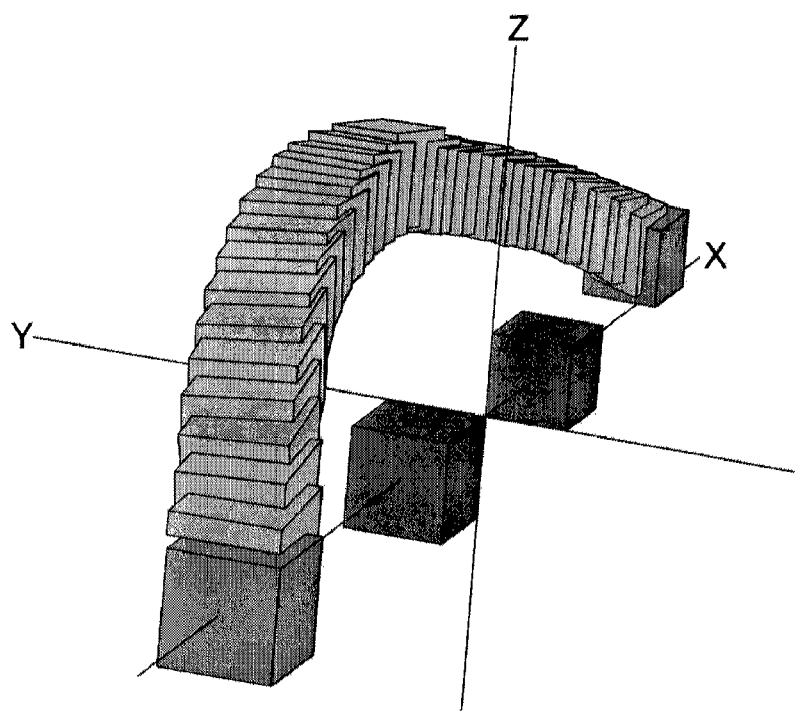
FIG. 21 is a diagram illustrating a snapshot in a state where a correction value is given to the target position and posture and the simulation is convergent after the simulation is carried out.
Figure 22:
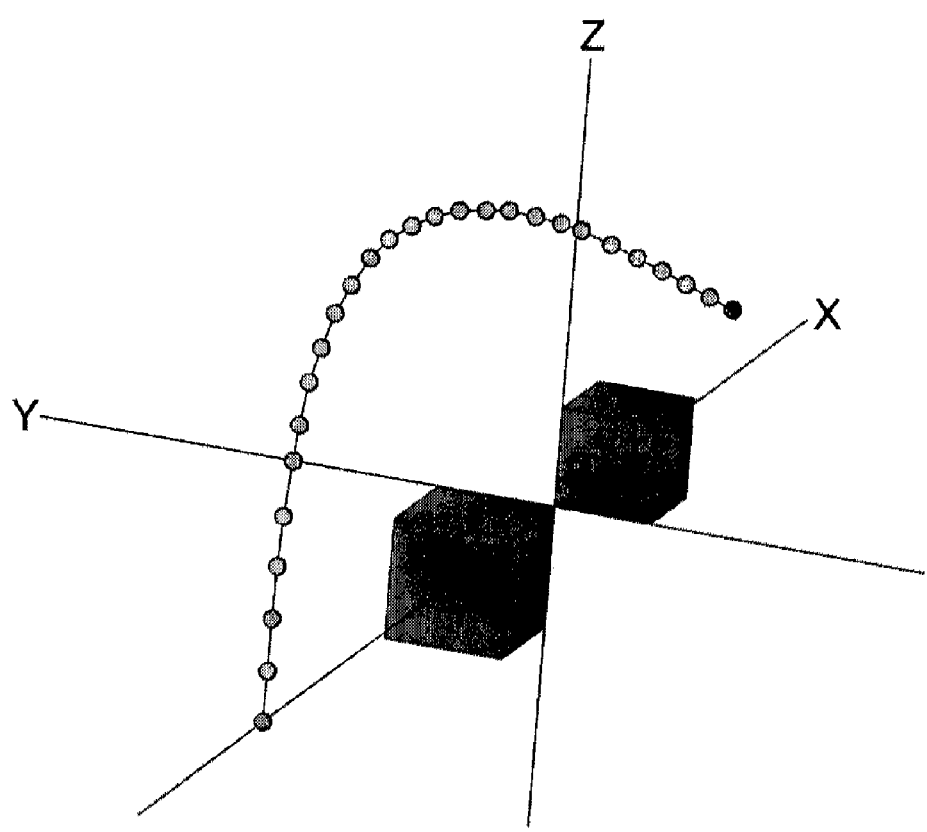
FIG. 22 is a diagram illustrating a snapshot in a state where a correction value is given to the target position and posture and the simulation is convergent after the simulation is carried out.

FIGS. 19 and 20 show a state where the multi rigid body system dynamics simulation is carried out and the rigid body group is statically determined. FIGS. 21 and 22 show snapshots in a state where a correction value is given to the target position and posture and the simulation is convergent after the simulation is carried out. In FIGS. 19 and 21, the control target objects are shown. In FIGS. 20 and 22, the control target objects are not shown and the gravity center positions of the rigid body group are shown as the nodes. It can be seen from FIGS. 19 to 22 that the path is excellently generated even when the target position and posture is corrected in real time.

By using the above-mentioned path planning method according to the embodiments of the invention, it can be seen that the requirements necessary for accomplishing the above-mentioned goals are all satisfied and the target path can be excellently generated. According to this method, the control such as the avoidance of the obstruction interference and the correction of the target position and posture can be unitedly treated without preparing for different algorithms and can be made in real time. As a result, this method is useful.

Figure 23:
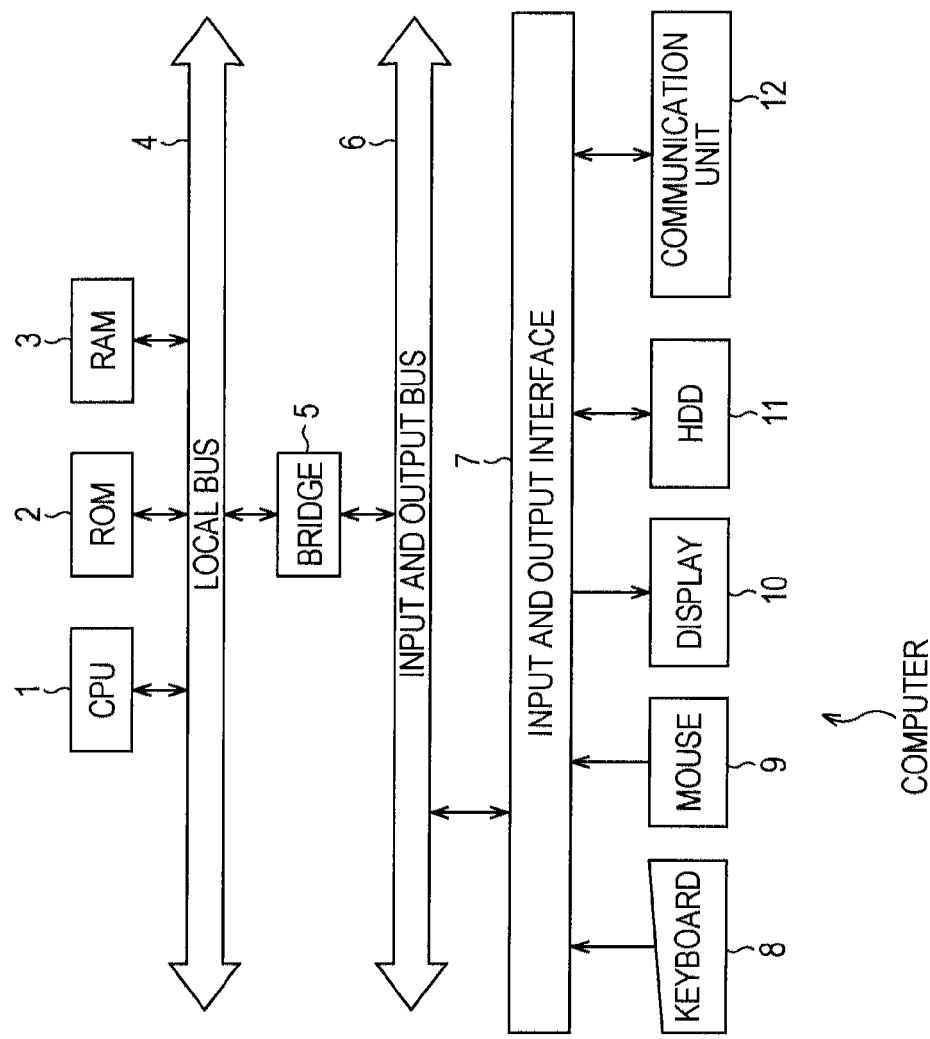
FIG. 23 is a diagram illustrating a configuration of a computer capable of embodying an embodiment of the invention.

The process (the system shown in FIG. 8) of generating a path of a control target is embodied by causing an information processing apparatus such as a computer to execute a predetermined application. FIG. 23 shows the configuration of a computer capable of embodying the invention.

A central processing unit (CPU) 1 executes programs stored in a read-only memory (ROM) 2 or a hard disk drive (HDD) 11 under a program executing environment provided from an operating system (OS). For example, the motion control of a multi-link structure or a process of generating the motion data thereof may be embodied by causing the CPU 1 to execute a predetermined program.

The ROM 2 permanently stores program codes of POST (Power On Self Test) or BIOS (Basic Input Output System). A random access memory (RAM) 3 is used to load the programs stored in the ROM 2 or the HDD 11 for the execution in the CPU 1 or to temporarily store work data of the programs in execution. The elements are connected to each other via a local bus 4 connected directly to a local pin of the CPU 1.

The local bus 4 is connected to an input and output bus 6 such as a PCI (Peripheral Component Interconnect) bus via a bridge 5.

A keyboard 8 and a pointing device 9 such as a mouse are input devices operated by a user. A display 10 is formed of an LCD (Liquid Crystal Display), a CRT (Cathode Ray Tube), or the like and serves to display a variety of information in texts or images.

The HDD 11 is a drive unit having a hard disk as a recording medium built therein and serves to drive the hard disk. The hard disk is used to install programs such as the operating system or various applications executed by the CPU 1 or to store data and files. For example, an application program for embodying the motion control of a multi-link structure or the process of generating the motion data thereof is installed in the HDD 11 or the files of the generated motion data is stored in the HDD 11.

A communication unit 12 is, for example, a LAN (Local Area Network) interface of wired communication or wireless communication. For example, an application program for embodying the process of generating a path from the present position and posture to the target position and posture of a robot or a multi-joint arm may be installed via a network. The path data may be downloaded via the network or the generated path data may be uploaded via the network.

The present application contains subject matter related to that disclosed in Japanese Priority Patent Application JP 2009-000002 filed in the Japan Patent Office on Jan. 1, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A path planning device for planning a position and posture path of a control target in a motion space from a present position and posture to a target position and posture, comprising:

an initial position and posture path acquiring unit which acquires an initial position and posture path including a plurality of nodes connecting the present position and posture of the control target to the target position and posture, and which configures a rigid body corresponding to the control target in each node in the position and posture path;

an interference detector which detects an interference with the control target in the position and posture path by an obstruction existing in the motion space;

an external force calculator which calculates external forces for each of a plurality of rigid bodies based on a dynamic model that uses the external forces to express a requirement for smoothing the position and posture path and for avoiding the interference by the obstruction, the dynamic model modeling each of the plurality of rigid bodies as a virtue rigid body plane not having a volume; and a multi rigid body system dynamics simulation unit which performs a multi rigid body system dynamics simulation on a plurality of equations of rigid body motion representing coupled motions of the plurality of rigid bodies on which the external forces calculated by the external force calculator act, respectively, and which acquires positions and postures of the control target at times corresponding to the nodes in the position and posture path on a basis of positions and postures of the rigid bodies when the path is convergent to a predetermined state.

2. The path planning device according to claim 1, wherein the initial position and posture path acquiring unit acquires a path between the present position of the control target and the target position on a basis of a search tree branched into a plurality of routes to the plurality of nodes and developed in the motion space, and wherein the initial position and posture path acquiring unit gives an initial posture to each of the rigid bodies located at each node.

3. The path planning device according to claim 1, wherein the interference detector applies a GJK algorithm (Gilbert-Johnson-Keerthi distance algorithm) to detect a shortest distance between each rigid body and the obstruction.

4. The path planning device according to claim 1, wherein the external force calculator uses the dynamical model in which the virtual rigid body plane fixed in a local coordinate system of each rigid body is defined and corresponding vertexes of neighboring virtual rigid body planes are connected to each other by springs having a predetermined spring constant and dampers having a predetermined damping constant to calculate, as the external forces expressing the requirement for smoothing the position and posture path, an inter-rigid-body force which is a sum of spring forces and damper forces acting between vertexes of one virtual rigid body plane and corresponding vertexes of a neighboring virtual rigid body plane and a rotational moment, which acts on the rigid body, about an origin of a global coordinate system including a sum of moments acting on the vertexes of each virtual rigid body due to the spring forces and the damper forces.

5. The path planning device according to claim 1, wherein the interference detector detects a shortest distance between each rigid body located at each node in the position and posture path and the obstruction, and
wherein the external force calculator calculates a repulsive force acting on each rigid body depending on the shortest distance as an external force expressing the requirement for causing the position and posture path to avoid the interference by the obstruction.

6. The path planning device according to claim 1, wherein the external force calculator calculates a moment corresponding to an angle formed by a forward moving direction of each rigid body fixed in a local coordinate system of the rigid body and a direction of the position and posture path between neighboring rigid bodies as the external force expressing a requirement for approaching an ideal position and posture path.

7. A path planning method of planning a position and posture path of a control target in a motion space from a present position and posture to a target position and posture, comprising the steps of:

acquiring, by an initial position and posture path acquiring unit, an initial position and posture path including a plurality of nodes connecting the present position and posture of the control target to the target position and posture and configuring a rigid body corresponding to the control target in each node in the position and posture path;

detecting, by an interference detector, an interference with the control target in the position and posture path by an obstruction existing in the motion space;

calculating, by a processor, external forces for each of a plurality of rigid bodies based on a dynamic model that uses external forces to express a requirement for smoothing the position and posture path and for avoiding the interference by the obstruction, the dynamic model modeling each of the plurality of rigid bodies as a virtue rigid body plane not having a volume; and performing, by the processor, a multi rigid body system dynamics simulation on a plurality of equations of rigid body motion representing coupled motions of the plurality of rigid bodies on which the calculated external forces act, respectively, and acquiring positions and postures of the control target at times corresponding to the nodes in the position and posture path on a basis of positions and postures of the rigid bodies when the path is convergent to a predetermined state.

8. A non-transitory computer readable storage medium encoded with a computer program which, when executed on a computer, causes the computer to perform processes of planning a position and posture path of a control target in a motion space from a present position and posture to a target position and posture, the computer program causing the computer to serve as:

an initial position and posture path acquiring unit which acquires an initial position and posture path including a plurality of nodes connecting the present position and posture of the control target to the target position and posture and which configures a rigid body corresponding to the control target in each node in the position and posture path;

an interference detector which detects an interference with the control target in the position and posture path by an obstruction existing in the motion space;

an external force calculator which calculates external forces for each of a plurality of rigid bodies based on a dynamic model that uses the external forces to express a requirement for smoothing the position and posture path and for avoiding interference by the obstruction, the dynamic model modeling each of the plurality of rigid bodies as a virtue rigid body plane not having a volume; and a multi rigid body system dynamics simulation unit which performs a multi rigid body system dynamics simulation on a plurality of equations of rigid body motion representing coupled motions of the plurality of rigid bodies on which the external forces calculated by the external force calculator act, respectively, and which acquires positions and postures of the control target at times corresponding to the nodes in the position and posture path on a basis of the positions and postures of the rigid bodies when the path is convergent to a predetermined state.

* * * * *